US008258982B2

(12) United States Patent
Miura

(10) Patent No.: US 8,258,982 B2
(45) Date of Patent: Sep. 4, 2012

(54) SAFE DRIVING EVALUATION SYSTEM AND SAFE DRIVING EVALUATION PROGRAM

(75) Inventor: Naoki Miura, Toyokawa (JP)

(73) Assignee: Aisin AW Co., Ltd., Anjo (JP)

( * ) Notice: Subject to any disclaimer, the term of this patent is extended or adjusted under 35 U.S.C. 154(b) by 279 days.

(21) Appl. No.: 12/561,831

(22) Filed: Sep. 17, 2009

(65) Prior Publication Data

US 2010/0109908 A1 May 6, 2010

(30) Foreign Application Priority Data

Oct. 30, 2008 (JP) ................................ 2008-280370

(51) Int. Cl.
*G08G 1/09* (2006.01)

(52) U.S. Cl. ........ 340/905; 340/901; 340/906; 340/911; 340/933; 340/985; 340/439; 340/576; 701/93; 701/96; 701/91; 701/79

(58) Field of Classification Search .................. 340/905, 340/901, 906, 911, 933, 995, 439, 576; 701/93, 701/96, 61, 79
See application file for complete search history.

(56) References Cited

U.S. PATENT DOCUMENTS

| | | | | |
|---|---|---|---|---|
| 6,356,812 | B1 * | 3/2002 | Cragun | 701/1 |
| 6,559,774 | B2 * | 5/2003 | Bergan et al. | 340/908 |
| 7,902,969 | B2 * | 3/2011 | Obradovich | 340/439 |
| 2001/0008989 | A1 | 7/2001 | Minowa et al. | |
| 2002/0095255 | A1 | 7/2002 | Minowa et al. | |

FOREIGN PATENT DOCUMENTS

| | | |
|---|---|---|
| EP | 1 997 705 | 12/2008 |
| JP | A-2004-199148 | 7/2004 |
| JP | A-2005-138762 | 6/2005 |
| JP | A-2005-234773 | 9/2005 |
| JP | A-2006-001369 | 1/2006 |
| JP | A-2006-308507 | 11/2006 |
| JP | A-2007-172487 | 7/2007 |
| JP | A-2007-293557 | 11/2007 |
| JP | A-2008-107974 | 5/2008 |
| JP | A-2008-165604 | 7/2008 |
| JP | A-2008-186045 | 8/2008 |
| WO | WO 2005/061267 | 7/2005 |
| WO | WO 2007/077867 | 7/2007 |
| WO | WO 2008/127465 | 10/2008 |

OTHER PUBLICATIONS

Feb. 15, 2010 European Search Report issued in EP 09 17 1222.
Japanese Patent Office, Notice of Reasons for Rejection mailed Apr. 19, 2012 in Japanese Patent Application No. 2008-280370 w/Human English-language Translation.

* cited by examiner

*Primary Examiner* — Tai T Nguyen
(74) *Attorney, Agent, or Firm* — Oliff & Berridge, PLC

(57) ABSTRACT

Safe driving evaluation systems, methods, and programs acquire traffic signal information that indicates the display status of a traffic signal present ahead in the traveling direction of a vehicle, determine the vehicle is within a prescribed stop supplement zone set up in front of the traffic signal installation point, and determine a red light encounter, which is a state where the vehicle is within the stop supplement zone and the traffic signal information indicates that the traffic signal is red. The systems, methods, and programs perform a stop supplementary operation with respect to a driver in order to stop the vehicle at the traffic signal installation point based on a driving operation of the vehicle during the red light encounter, and calculate a stop supplement percentage.

16 Claims, 7 Drawing Sheets

F I G . 2
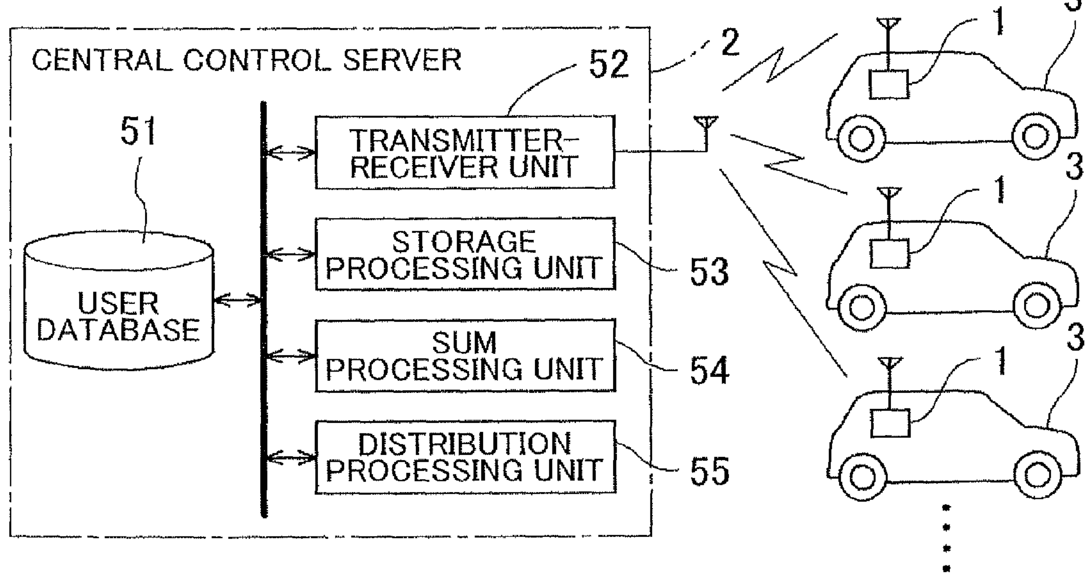
F I G . 3
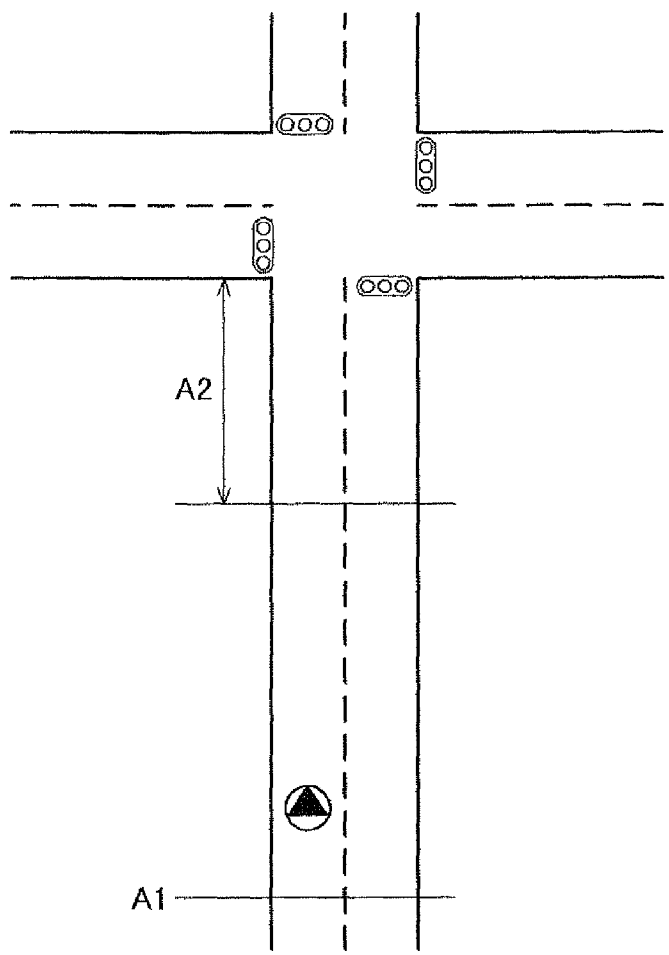

SAFE DRIVING EVALUATION SYSTEM AND SAFE DRIVING EVALUATION PROGRAM

INCORPORATION BY REFERENCE

The disclosure of Japanese Patent Application No. 2008-280370 filed on Oct. 30, 2008 including the specification, drawings and abstract is incorporated herein by reference in its entirety.

BACKGROUND OF THE INVENTION

The present invention relates to a safe driving evaluation system and a safe driving evaluation program that can increase a driver's awareness of safe driving and help improve the driver's safe driving skills when traveling through a traffic signal installation point.

DESCRIPTION OF THE RELATED ART

Recently, safe driving has been evaluated in various scenarios of vehicle travel, including while the vehicle passes a traffic signal. The evaluation result of the vehicle is compared with that of other vehicles, and the results are then ranked or scored (see Japanese Patent Application Publication Nos. JP-A-2007-172487 and JP-A-2008-186045 for examples of such art). With respect to a safe driving evaluation related to traffic signals, JP-A-2007-172487 describes a system configuration that executes image processing on an image of a traffic signal taken by an on-vehicle camera to find the light status of the traffic signal, and calculates a signal compliance degree based on the light status of the traffic signal when the vehicle passed the traffic signal. In addition, JP-A-2008-186045 describes a system configuration for a safe driving evaluation related to traffic signals that acquires traffic signal information through road-to-vehicle communication and an image taken by an on-vehicle camera. If an upcoming traffic signal is red, the system determines whether a stop is made at the traffic signal such that the vehicle speed reaches zero before the stop line corresponding to the traffic signal.

SUMMARY OF THE INVENTION

In the systems described in JP-A-2007-172487 and JP-A-2008-186045, the safe driving evaluations related to traffic signals are based only on determinations regarding the light status of the traffic signal and whether the vehicle stopped at the traffic signal. If the traffic signal ahead of the vehicle is red, the systems can encourage the driver to stop the vehicle. However, these systems cannot adequately increase the driver's awareness of safe driving when traveling through the traffic signal installation point. As an example, the driver may miss the fact that an upcoming traffic signal is red until the vehicle is immediately in front of the stop line and then slam on the brakes to stop the vehicle right before the stop line. Even so, a positive evaluation is made because the vehicle stopped before the stop line corresponding to the red traffic signal. Therefore, although the driver performed a driving operation contrary to safely stopping the vehicle (e.g. depressed the accelerator pedal) before the traffic signal installation point when the upcoming traffic signal was red, this driving operation is not reflected in the safe driving evaluation related to traffic signals.

The present invention was devised in light of the foregoing problem, and provides a safe driving evaluation system and a safe driving evaluation program that increase a driver's awareness of safe driving and helps improve the driver's safe driving skills when traveling through a traffic signal installation point by suitably evaluating the driver's operation before the traffic signal installation point when the upcoming traffic signal is red.

In order to achieve the above object, a safe driving evaluation system according to a first aspect of the present invention includes: a traffic signal information acquisition unit that acquires traffic signal information that indicates the display status of a traffic signal present ahead in the traveling direction of a vehicle; a zone determination unit that determines the vehicle is within a prescribed stop supplement zone set up in front of a traffic signal installation point at which the traffic signal is installed; a red light determination unit that determines a red light encounter, which is a state where the vehicle is within the stop supplement zone and the traffic signal information indicates that the traffic signal is red; a stop supplement unit that performs a stop supplementary operation with respect to a driver in order to stop the vehicle at the traffic signal installation point, based on a driving operation of the vehicle during the red light encounter; and a percentage calculation unit that calculates a stop supplement percentage as a ratio of a stop supplement frequency, which is the number of times the stop supplementary operation is performed, to a red light encounter frequency, which is the number of times the vehicle has the red light encounter.

Note that the term "stop supplement" in the present application is used as a concept that comprehensively includes driver notification, vehicle control, or the like. The driver notification may be a caution given to the driver using audio or a screen display, for example. The vehicle control may be an operation supplement such as a brake assist that supplements the driver's brake operation, or a stopping operation that stops the vehicle such as forced braking that forcibly operates the brakes and a throttle closing control that forcibly sets the throttle opening to zero.

The term "red light" in the present application means that the vehicle must not cross a stop position that corresponds to a traffic signal displaying a red light, although the display color of the traffic signal is obviously not limited to red. The term "red light" is used as a concept that comprehensively includes any signal indicating a display status that corresponds to the meaning above.

According to the above constitution, it is possible to suitably determine a red light encounter in which the vehicle encounters a red light at an upcoming traffic signal installation point. Fewer stop supplementary operations performed during red light encounters indicates safer driving. Therefore, a stop supplement percentage is calculated as a ratio of a stop supplement frequency, which is the number of times the stop supplementary operation is performed, to a red light encounter frequency, which is the number of times the vehicle has the red light encounter. A safe driving evaluation is then performed based on the stop supplement percentage. Consequently, the driver can be encouraged to practice safe driving that does not require the stop supplementary operation at a red light encounter. It is thus possible to increase the driver's awareness of safe driving and help improve the driver's safe driving skills.

Here, the stop supplement unit may perform the stop supplementary operation if an accelerator operation amount of the vehicle during the red light encounter is greater than a predetermined value. Note that the predetermined value is preferably set to below an accelerator operation amount for maintaining the vehicle running at a constant speed, e.g. the predetermined value may be set to an accelerator operation amount of zero.

If the accelerator operation amount being greater than the predetermined value regardless of whether the traffic signal ahead indicates a red light, this may be an indication that the driver has no intent of stopping at the red light and is a problem in terms of safe driving. According to this constitution, the stop supplementary operation is performed if the accelerator operation amount is larger than the predetermined value at the red light encounter, and the safe driving evaluation is performed based on the stop supplement percentage, which is calculated as a ratio of the stop supplement frequency to the red light encounter frequency. Therefore, the driver can be encouraged to reduce the accelerator operation amount. It is thus possible to surely suppress acceleration of the vehicle, as well as increase the driver's awareness of safe driving and help improve the driver's safe driving skills, when a traffic signal present ahead in the traveling direction of the vehicle indicates a red light.

If the stop supplementary operation is performed, the percentage calculation unit may correct the stop supplement percentage to a higher value if the traffic signal information indicates that the traffic signal is red when the vehicle passes a prescribed determination position set before the stop supplement zone.

According to this constitution, when the traffic signal ahead in the traveling direction of the vehicle indicates a red light before the vehicle enters the stop supplement zone, the stop supplementary operation is performed at the red light encounter. Therefore, the stop supplement percentage is increased above normal and the safe driving evaluation is performed based on this stop supplement percentage. It is thus possible to surely suppress unsuitable driving operations at red light encounters.

The determination position may be set more forward in the traveling direction than a position at which the driver visually recognizes the display status of the traffic signal installed at the traffic signal installation point.

Here, the position at which the driver can visually recognize the display status of the traffic signal may be a position at which the driver can visually confirm the display status of the traffic signal, or a position at which the driver can recognize the display status of the traffic signal by audio means or a screen display, for example. According to this constitution, the determination position can be suitably set based on whether the driver can recognize a red light. Therefore, an appropriate stop supplement percentage that matches the driver's senses can be calculated.

The traffic signal information acquisition unit may use either or both information acquired through road-to-vehicle communication and information acquired from an image recognition result for an image taken of the traffic signal by an on-vehicle camera to acquire the traffic signal information.

According to this constitution, the display status of the traffic signal present ahead in the traveling direction of the vehicle can be reliably acquired. Therefore, the stop supplementary operation can be suitably performed and the reliability of the stop supplement percentage further increased.

The safe driving evaluation system may further include a yellow-light-stop determination unit that determines the vehicle has stopped at a yellow light if the traffic signal information indicates that the traffic signal is yellow when the vehicle stopped at the traffic signal installation point, wherein the percentage calculation unit corrects the stop supplement percentage to a lower value in accordance with a yellow light stopping frequency, which is the number of times stopping at a yellow light is determined.

The term "yellow light" in the present application means that, unless the vehicle cannot be safely stopped, the vehicle must not cross a stop position that corresponds to a traffic signal displaying a yellow light, although the display color of the traffic signal is obviously not limited to yellow. The term "yellow light" is used as a concept that comprehensively includes any signal indicating a display status that corresponds to the meaning above.

According to this constitution, a yellow stop that stop the vehicle while the traffic signal ahead is yellow lowers the stop supplement percentage, and the safe driving evaluation is performed based on this stop supplement percentage. Therefore, it is possible to encourage the driver to stop at yellow lights, which is an operation that contributes to safe driving.

The safe driving evaluation system may further include a yellow-light-run determination unit that determines the vehicle has run a yellow light if the traffic signal information indicates that the traffic signal is yellow when the vehicle passes the traffic signal installation point, wherein the percentage calculation unit corrects the stop supplement percentage in accordance with a yellow light running frequency, which is the number of times running of the yellow light is determined, and the yellow light stopping frequency.

According to this constitution, the stop supplement percentage can be corrected in a more suitable manner compared to correcting the stop supplement percentage using only the yellow light stopping frequency. For example, the ratio of the yellow light stopping frequency to the sum of the yellow light running frequency and the yellow light stopping frequency may be calculated, and the stop supplement frequency corrected based on this ratio. Consequently, the ratio of operations performed that contribute to the driver's safe driving can be suitably reflected in the stop supplement percentage.

The safe driving evaluation system may further include a preceding vehicle detection unit that detects another vehicle present ahead within a predetermined distance in the traveling direction of the host vehicle, wherein if the preceding vehicle detection unit detects another vehicle present ahead within a predetermined distance in the traveling direction of the host vehicle inside the stop supplement zone, the stop supplement zone is excluded from the calculation of the stop supplement percentage.

If there is another vehicle ahead of the host vehicle, the driving operation performed within the stop supplement zone may not follow the driver's intent depending on the relationship with the other vehicle. Therefore, if such cases are also included in the calculation, the stop supplement percentage may not suitably reflect the driving operations of the driver. Hence, by adopting the constitution described above, the calculated stop supplement percentage can more accurately match the actual circumstances.

The safe driving evaluation system may further include a preceding vehicle detection unit that detects another vehicle present ahead within a predetermined distance in the traveling direction of the host vehicle, wherein if another vehicle is detected ahead within the predetermined distance in the traveling direction of the host vehicle at the time the host vehicle stops at the traffic signal installation point, the yellow-light-stop determination unit determines that the host vehicle has not stopped at a yellow light even though the traffic signal information indicates that the traffic signal is yellow.

If there is another vehicle ahead of the host vehicle, stopping at the yellow light may be unrelated to the driver's intent due to the other vehicle stopped at the yellow light. Therefore, if such cases are also included in the calculation, the stop supplement percentage may not suitably reflect the driving operations of the driver. Hence, by adopting the constitution described above, the calculated stop supplement percentage can more accurately match the actual circumstances.

The safe driving evaluation system may further include an accident information acquisition unit that acquires information regarding the number of accidents that have occurred in the past at each traffic signal installation point, wherein when calculating the stop supplement percentage, for each traffic signal installation point at which the stop supplementary operation has been performed, the percentage calculation unit corrects the stop supplement percentage in accordance with the number of accidents at the traffic signal installation point.

According to this constitution, the stop supplement percentage can be corrected to a higher value in accordance with a larger number of past accidents at each traffic signal installation point. Therefore, at a traffic signal installation point where there have been many accidents, the driver can be cautioned more to perform appropriate driving operations if the traffic signal installed at the traffic signal installation point is red.

The safe driving evaluation system may further include an evaluation information acquisition unit that acquires evaluation information based on the stop supplement percentage, wherein the evaluation information acquisition unit acquires as the evaluation information at least one of points assigned depending on the stop supplement percentage, advice whose content depends on the stop supplement percentage, and a graph display that visually represents the stop supplement percentage at certain times.

According to this constitution, the acquired evaluation information is represented in an easily understandable form for the driver in accordance with the stop supplement percentage. Therefore, the driver can be objectively and suitably informed of an overall trend regarding how safely he or she is driving before traffic signal installation points based on the evaluation information. It is thus possible to increase a driver's awareness of safe driving and help improve the driver's safe driving skills when traveling through a traffic signal installation point.

The safe driving evaluation system may further include an evaluation information acquisition unit that acquires evaluation information based on the stop supplement percentage; and an information collection unit that collects information regarding the stop supplement percentage from a plurality of vehicles, wherein the evaluation information acquisition unit acquires as the evaluation information at least one of a ranking for each vehicle regarding the stop supplement percentage as compared to the other vehicles and a level assigned based on the past stop supplement percentages of each vehicle compared to the other vehicles.

According to this constitution, the stop supplement percentages from the plurality of vehicles are collected and compared, and the acquired evaluation information has a placement of the host vehicle in relation to the other vehicles represented in an easily understandable form for the driver. Therefore, the driver can be objectively and suitably informed of an overall trend regarding how safely he or she is driving before traffic signal installation points. It is thus possible to increase a driver's awareness of safe driving and help improve the driver's safe driving skills when traveling through a traffic signal installation point.

The safe driving evaluation system may further include an on-vehicle terminal device installed in the vehicle; and a central control device provided in communication with a plurality of the on-vehicle terminal devices, wherein when a main power source of the vehicle installed with the on-vehicle terminal device is turned off, the on-vehicle terminal device sends information regarding the stop supplement percentage between turning the main power source on and off to the central control device, and the central control device generates the evaluation information for the on-vehicle terminal device based on the information regarding the stop supplement percentage received from the on-vehicle terminal device.

According to this constitution, information regarding the stop supplement percentage is collected in the central control device from the on-vehicle terminal devices respectively installed in the plurality of vehicles. Based on the information regarding the stop supplement percentages for the plurality of vehicles, the evaluation information for each on-vehicle terminal device can be generated. Accordingly, evaluation information with suitable content based on a comparison of the plurality of vehicles can be provided to each on-vehicle terminal device. In addition, when the main power source of the vehicle installed with the on-vehicle terminal device is turned off, information regarding the stop supplement percentage between turning the main power source on and off is sent to the central control device. Therefore, it is possible to collect the information regarding the stop supplement percentage while the main power source of the vehicle is turned on in the central control device with a small number of communications. Consequently, much information can be efficiently collected in the central control device so that more suitable evaluation information can be provided to each on-vehicle terminal device.

The technical constitution of the safe driving evaluation system according to the first aspect of the present invention, having the respective constitutions described above, may be applied to a safe driving evaluation method and a safe driving evaluation program, and therefore, the present invention also claims rights as this type of method and program.

A safe driving evaluation program in such case performs in a computer the functions of: acquiring traffic signal information that indicates the display status of a traffic signal present ahead in the traveling direction of a vehicle; determining the vehicle is within a prescribed stop supplement zone set up in front of a traffic signal installation point at which a traffic signal is installed; determining a red light encounter, which is a state where the vehicle is within the stop supplement zone and the traffic signal information indicates that the traffic signal is red; performing a stop supplementary operation with respect to a driver in order to stop the vehicle at the traffic signal installation point, based on a driving operation of the vehicle during the red light encounter; and calculating a stop supplement percentage as a ratio of a stop supplement frequency, which is the number of times a stop supplementary operation is performed, to a red light encounter frequency, which is the number of times the vehicle has the red light encounter.

Needless to say, this safe driving evaluation program is also capable of obtaining the actions and effects of the safe driving evaluation system described above, and moreover, the several techniques cited as preferred constitutional examples thereof may be incorporated therein.

BRIEF DESCRIPTION OF THE DRAWINGS

FIG. 2 is a block diagram that shows an overall configuration of a central control server according to the embodiment of the present invention;

FIG. 3 is a drawing that shows an example for setting a determination position and a stop supplement zone before a traffic signal installation point;

DETAILED DESCRIPTION OF THE EMBODIMENTS

Figure 1:
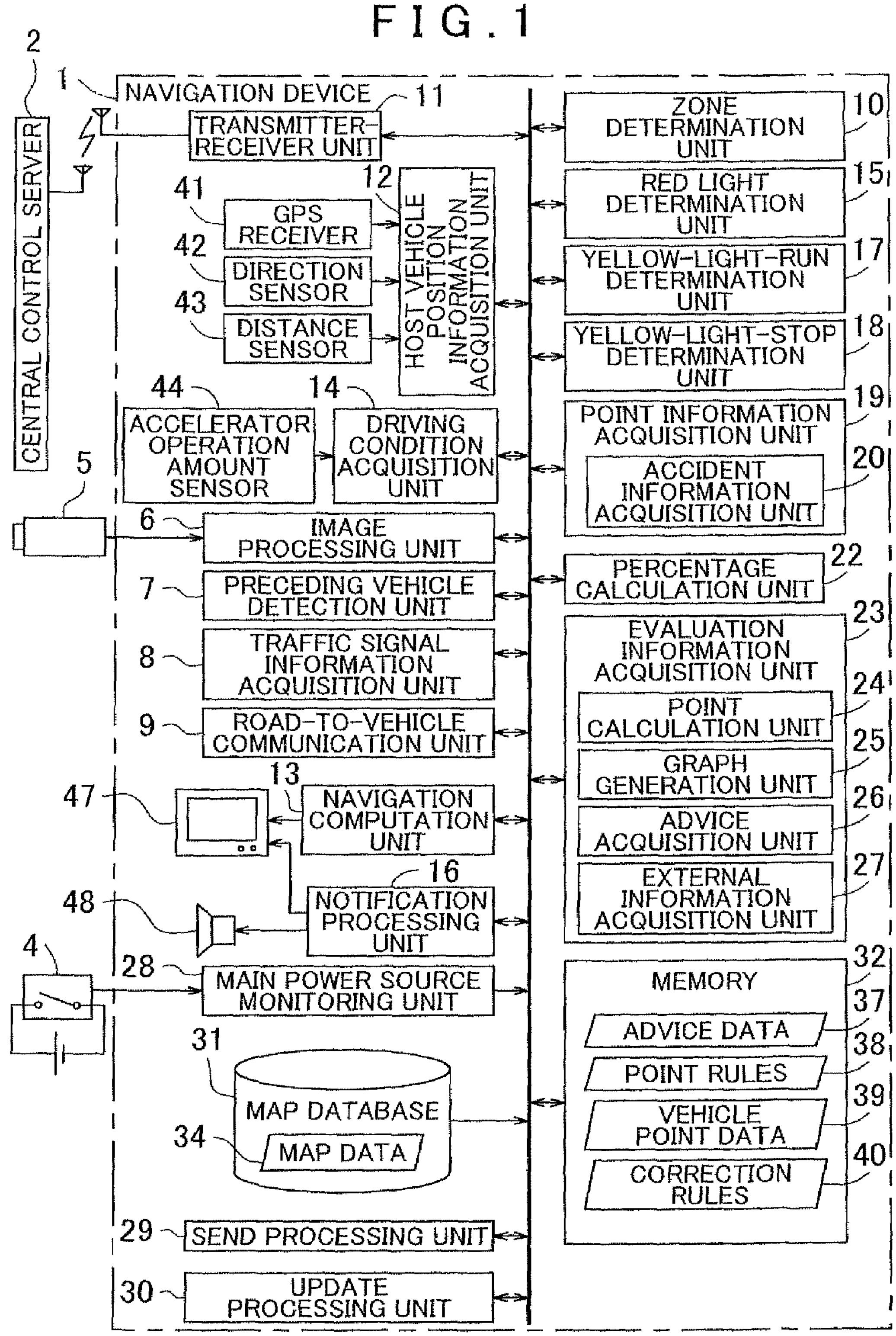
FIG. 1 is a block diagram that shows an overall configuration of a navigation device according to an embodiment of the present invention.

Embodiments of the present invention will be described now with reference to the drawings. The description here regards an example in which the safe driving evaluation system according to the present invention includes an on-vehicle navigation device 1 and a central control server 2 that is provided in communication with a plurality of navigation devices 1. FIG. 1 is a block diagram that shows an overall configuration of the navigation device 1. The navigation device 1 that forms the safe driving evaluation system determines whether a vehicle 3 will encounter a red light at an upcoming traffic signal installation point, that is, whether the vehicle 3 will have a red light encounter. If the vehicle 3 will encounter a red light, the navigation device 1 then determines whether the driver's operation based on an accelerator operation amount of the vehicle 3 is suitable in terms of stopping the vehicle 3 at the red light. If the driver's operation is determined to be unsuitable, a stop supplementary operation for stopping the vehicle 3 at the traffic signal installation point is performed. Note that in the present embodiment, this stop supplementary operation is an audio caution to the driver. Furthermore, evaluation information 61 (see FIGS. 4 and 5) is acquired and output based on a stop supplement percentage that is calculated as a ratio of a stop supplement frequency, which is the number of times a stop supplementary operation is performed, to a red light encounter frequency, which is the number of times the vehicle 3 has a red light encounter. In the evaluation information 61, a lower stop supplement percentage results in a better evaluation. Accordingly, the driver of the vehicle 3 installed with the navigation device 1 can objectively find out an overall trend regarding how safely he or she is driving before traffic signal installation points based on the evaluation information 61. It is thus possible to increase a driver's awareness of safe driving and help improve the driver's safe driving skills when traveling through a traffic signal installation point.

FIG. 2 is a block diagram that shows an overall configuration of the central control server 2. The central control server 2 collects and sums information from the plurality of navigation devices 1 that are respectively installed in a plurality of vehicles 3. The central control server 2 then generates the evaluation information 61 from the collected information and distributes the evaluation information 61 to the navigation devices 1. In the present embodiment, the navigation device 1 corresponds to an on-vehicle terminal device of the present invention, and the central control server 2 corresponds to a central control device and an information collection unit of the present invention.

1. Configuration of Navigation Device

The configuration of the navigation device 1 will now be described. The components of the navigation device 1 shown in FIG. 1 each have as its core member a computation processing device such as a CPU or the like that is one of mutually shared and independently utilized. Each component executes various processes on received data that may be implemented by hardware, software (a program), or via a combination of both hardware and software. In the present embodiment, the navigation device 1 includes a transmitter-receiver unit 11; a host vehicle position acquisition unit 12; a driving condition acquisition unit 14; an image processing unit 6; a preceding vehicle detection unit 7; a signal information acquisition unit 8; a road-to-vehicle communication unit 9; a navigation computation unit 13; a notification processing unit 16; a main power source monitoring unit 28; a send processing unit 29; an update processing unit 30; a zone determination unit 10; a red light determination unit 15; a yellow-light-run determination unit 17; a yellow-light-stop determination unit 18; a point information acquisition unit 19; a percentage calculation unit 22; and an evaluation information acquisition unit 23. Each component is also configured to exchange information with the other components. If each component is implemented through software (a program), the software is stored in a storage unit such as a RAM or ROM to which the computation processing device can refer. A map database 31 has a hardware configuration that includes a storage medium (a storage unit) such as a hard disk drive, a flash memory, a DVD drive equipped with a DVD-ROM, or a CD drive equipped with a CD-ROM, for example. A memory 32 also has a hardware configuration that includes a storage medium that is capable of storing and re-writing information, such as a hard disk drive or a flash memory. In addition, the memory 32 may be provided in a storage medium shared with the map database 31 if the map database 31 is configured by a re-writable storage medium. The configuration of each component of the navigation device 1 according to the present embodiment will be explained in detail below.

1-1. Map Database

The map database 31 is a database in which map data 34 is stored. Further, the map data 34 includes road network data constituted by a plurality of nodes that represent a plurality of intersections, and a plurality of links connecting the nodes that represent roads. In addition to the road network data, the map data 34 includes rendering information required in map display processing and various types of guidance information required in route guidance processing, which are performed by the navigation computation unit 13. Here, the rendering information includes information such as background information required to display road shapes, buildings, rivers and so on, character information required to display city, town and village names, road names, and so on. In addition to this, the map data 34 stored in the map database 31 includes information that indicates the positions of points installed with traffic signals (referred to as signal installation points below). The information that indicates the positions of signal installation points can be stored as additional information for nodes that represent intersections installed with traffic signals (e.g. as a flag that indicates whether there is a traffic signal), or stored as attribute information for links that are connected to such nodes (e.g. information that indicates a traffic signal on one link end).

1-2. Transmitter-Receiver Unit

The transmitter-receiver unit 11 includes a communication device that sends data to the central control server 2 and receives data from the central control server 2 by wireless communication via a wireless base station or the like. A conventional communication network such as a cellular telephone network or a wireless LAN (Local Area Network), for example, may be used as a wireless communication method. In the present embodiment, the transmitter-receiver unit 11 sends information regarding the stop supplement percentage to the central control server 2, as will be explained later. In addition, the transmitter-receiver unit 11 receives the evaluation information 61 (see FIGS. 4 and 5) that is based on a comparison with other vehicles 3, such as ranking information 65 and level information 66, from the central control server 2. The transmitter-receiver unit 11 also receives update information for updating advice data 37, point rules 38, and correction rules 40 stored in the memory 32. These will be described in more detail later. Furthermore, the transmitter-receiver unit 11 receives point information pertaining to the traffic signal installation points from the central control server 2, and outputs the point information to the point information acquisition unit 19. The point information includes accident information regarding the number of accidents that have occurred in the past at each of the traffic signal installation points, and such information is output to the accident information acquisition unit 20.

1-3. Host Vehicle Position Information Acquisition Unit

The host vehicle position information acquisition unit 12 acquires host vehicle position information that indicates the current position of the host vehicle 3. The host vehicle position information acquisition unit 12 is connected to a Global Positioning System (GPS) receiver 41, a direction sensor 42, and a distance sensor 43. Here, the GPS receiver 41 is a device that receives a GPS signal from a GPS satellite. The GPS signal is normally received every second and output to the host vehicle position information acquisition unit 12. In the host vehicle position information acquisition unit 12, the signal received by the GPS receiver 41 from the GPS satellite may be analyzed, and additional information may be acquired, such as the current position (coordinates) of the vehicle, the direction in which the vehicle is heading, the vehicle speed, and the like. The direction sensor 42 detects the direction in which the host vehicle 3 is heading and changes in the heading of the host vehicle. The direction sensor 42 may be a gyroscope, a geomagnetic sensor, or the like, for example. Also, the direction sensor 42 outputs the detected heading of the host vehicle to the host vehicle position information acquisition unit 12. The distance sensor 43 detects the speed of the host vehicle 3 and the distance traveled. The distance sensor 43 may be configured as a vehicle speed pulse sensor that outputs a pulse signal every time a drive shaft, wheel, or the like of the vehicle 3 rotates a certain amount, a yaw rate sensor and a G sensor that detect an acceleration of the host vehicle 3, and a circuit that integrates the detected acceleration, for example. Also, the distance sensor 43 outputs information regarding the detected vehicle speed and the detected distance traveled to the host vehicle position information acquisition unit 12.

Based on the outputs from the GPS receiver 41, the direction sensor 42, and the distance sensor 43, the host vehicle position information acquisition unit 12 performs a computation to determine the host vehicle position using conventional methods. In addition, the host vehicle position information acquisition unit 12 executes a correction to match the host vehicle position with a road in the map data 34 by executing a conventional map matching process based on the map data 34 stored in the map database 31. The host vehicle position information corrected by the map matching process is reflected in the host vehicle position information. Thus the host vehicle position information acquisition unit 12 acquires the host vehicle position information that includes the current host vehicle position indicated by the coordinates (longitude and latitude) and information on the current vehicle heading.

1-4. Navigation Computation Unit

The navigation computation unit 13 is a computation processing unit that operates in accordance with an application program in order to execute navigation functions such as displaying the host vehicle position, calculating a route from a departure point to a destination, providing guidance for a route to the destination, and searching for a destination. For example, the navigation computation unit 13 acquires the map data 34 around the host vehicle from the map database 31 to display a map image on a display input device 47, and also executes a process to display a host vehicle position mark superimposed over the map image based on the host vehicle position information. Additionally, the navigation computation unit 13 provides route guidance using either or both the display input device 47 and an audio output device 48, based on the host vehicle position information and a route calculated using a conventional method from the departure point to the destination. The display input device 47 outputs the evaluation information 61 received from the evaluation information acquisition unit 23 (to be explained in more detail later). Note that in addition to the above, the navigation computation unit 13 is connected to various types of conventional components that are required for the navigation device 1, such as a remote controller and a user interface that may be a touch panel integrally provided with the display input device 47.

1-5. Driving Condition Acquisition Unit

The driving condition acquisition unit 14 acquires a driving condition of the vehicle 3. In the present embodiment, the driving condition acquisition unit 14 is connected to an accelerator operation amount sensor 44. Here, the accelerator operation amount sensor 44 detects an accelerator operation amount based on a depression amount of an accelerator pedal. The accelerator operation amount is acquired as 0% when the accelerator is not depressed and as 100% when the accelerator is fully depressed. Note that information pertaining to the accelerator operation amount is output to the notification processing unit 16 and used to determine whether to perform a stop supplementary operation, i.e., caution the driver.

Further note that the driving condition acquisition unit 14 may be connected to a brake operation amount sensor for detecting a brake operation amount based on the brake hydraulic pressure, or a vehicle speed sensor that detects the vehicle speed based on the rotational speed of the drive shaft that is drivingly connected to the wheel of the vehicle 3.

1-6. Zone Determination Unit

The zone determination unit 10 determines whether the vehicle 3 is within a prescribed stop supplement zone set up in front of the traffic signal installation point. The zone determination unit 10 determines whether the host vehicle 3 is in a stop supplement zone A2 based on information stored in the map database 31 that represents the position of the traffic signal installation point and the host vehicle position information acquired by the host vehicle position information acquisition unit 12. Here, using the traffic signal installation point as the point of origin, the stop supplement zone A2 is set on a forward side with respect to the traveling direction of the vehicle 3 (set so as to extend back toward the rear side of the vehicle 3) as illustrated in FIG. 3. In the present embodiment, the stop supplement zone A2 is set to a length of 100 meters as an example. Also note that the length of the stop supplement zone A2 is suitably set to a distance required for effectively performing a stop supplementary operation in order to stop the vehicle 3 at the traffic signal installation point. For example, any value selected from 10 meters to 100 meters may be set as the length.

If it is determined that the vehicle 3 is in the stop supplement zone A2, the zone determination unit 10 outputs such information to the red light determination unit 15.

The zone determination unit 10 is further configured so as to determine whether the vehicle 3 has passed a determination position A1 (see FIG. 3), which is set more forward than the stop supplement zone A2 with respect to the traveling direction of the vehicle 3 (set so as to extend back toward the rear side of the vehicle 3). In the present embodiment, the distance between the determination zone A1 and the traffic signal installation point is set to a length of 200 meters as an example. Note that the determination position A1 is suitably set more forward than a forward end side of the stop supplement zone A2, and also set more forward in the traveling direction than a position at which the driver can visually recognize the display status of the traffic signal installed at the traffic signal installation point.

Once the vehicle 3 passes the determination position A1, the zone determination unit 10 outputs information indicating that the vehicle 3 has passed the determination position A1 to the red light determination unit 15.

1-7. Traffic Signal Information Acquisition Unit

The traffic signal information acquisition unit 8 acquires traffic signal information that indicates the display status of a traffic signal present ahead in the traveling direction of the vehicle 3. In the present embodiment, the navigation device 1 includes the road-to-vehicle communication unit 9, and the traffic signal information acquisition unit 8 acquires traffic signal information through the road-to-vehicle communication unit 9.

The road-to-vehicle communication unit 9 enables communication with a communication device installed on the roadside. When the vehicle 3 approaches a traffic signal installation point, the road-to-vehicle communication unit 9 acquires traffic signal information that indicates the display status of a traffic signal corresponding to the traveling direction of the vehicle 3. Note that in the present embodiment, communication with the communication device installed on the roadside is performed through the transmitter-receiver unit 11. The traffic signal information acquired by the road-to-vehicle communication unit 9 pertaining to the display status of the traffic signal is output to the traffic signal information acquisition unit 8.

1-8. Preceding Vehicle Detection Unit

The preceding vehicle detection unit 7 detects whether another vehicle 3 is present ahead within a predetermined distance in the traveling direction of the vehicle 3. In the present embodiment, the navigation device 1 includes the image processing unit 6, and the preceding vehicle detection unit 7 detects whether another vehicle 3 is present ahead within a predetermined distance based on information received from the image processing unit 6. Note that the predetermined distance may be any value selected from 0 meters to 100 meters, for example.

The image processing unit 6 executes image processing on an image taken by the on-vehicle camera 5 provided in the vehicle 3. In the present embodiment, the on-vehicle camera 5 is installed so as to be capable of taking images in the forward traveling direction of the vehicle 3, and can output images taken in the forward traveling direction of the vehicle 3 to the image processing unit 6. By executing image processing on the images received from the on-vehicle camera 5, the image processing unit 6 can determine whether another vehicle 3 is present ahead within the predetermined distance in the traveling direction of the vehicle 3. If it is determined that another vehicle 3 is present, the image processing unit 6 outputs such information to the preceding vehicle detection unit 7.

If another vehicle 3 is detected within the predetermined distance ahead, the preceding vehicle detection unit 7 outputs information that indicates another vehicle 3 is present ahead with the predetermined distance to the notification processing unit 16 and the yellow-light-stop determination unit 18 to be described later.

Note that if the vehicle 3 includes a millimeter wave radar, the preceding vehicle detection unit 7 may use a signal from the millimeter wave radar to detect whether another vehicle 3 is present ahead within the predetermined distance in the traveling direction of the vehicle 3.

1-9. Red Light Determination Unit

The red light determination unit 15 determines a red light encounter, which is a state where the vehicle 3 is within the stop supplement zone and the traffic signal information indicates the traffic signal is red. If the red light determination unit 15 receives information from the zone determination unit 10 that indicates the vehicle 3 is in the stop supplement zone A2, the red light determination unit 15 acquires the traffic signal information for the traffic signal installed at the traffic signal installation point ahead from the traffic signal acquisition unit 8. Furthermore, if the traffic signal is red, the red light determination unit 15 determines that the vehicle 3 will have a red light encounter. The red light determination unit 15 then outputs information that indicates the vehicle 3 will have a red light encounter to the percentage calculation unit 22 and the notification unit 16, which determines whether to caution the driver, i.e., perform a stop supplementary operation.

The red light determination unit 15 also has a function for determining whether the traffic signal installed at the traffic signal installation point ahead is a red light once the vehicle 3 passes the determination position A1. If the red light determination unit 15 receives information from the zone determination unit 10 that indicates the vehicle 3 has passed the determination position A1, the red light determination unit 15 acquires the traffic signal information for the traffic signal installed at the traffic signal installation point ahead from the traffic signal acquisition unit 8. Information regarding whether the traffic signal is red when the vehicle 3 passed the determination position A1 is output to the percentage calculation unit 22.

1-10. Yellow-Light-Run Determination Unit

The yellow-light-run determination unit 17 determines the vehicle 3 has run a yellow light if the traffic signal installed at the traffic signal installation point is yellow when the vehicle 3 passes the traffic signal installation point. The yellow-light-run determination unit 17 determines whether the host vehicle 3 has passed the traffic signal installation point based on information stored in the map database 31 that represents the position of the traffic signal installation point and the host vehicle position information acquired by the host vehicle position information acquisition unit 12. If it is determined that the vehicle 3 passed the traffic signal installation point, the traffic signal information for the traffic signal at the time the vehicle 3 passed the traffic signal installation point is acquired from the traffic signal information acquisition unit 8. If the traffic signal is yellow at the time the vehicle 3 passed the traffic signal installation point, the yellow-light-run determination unit 17 determines that the vehicle 3 has run a yellow light, and updates and adds 1 to a yellow light running frequency, which is the number of times the vehicle 3 ran a yellow light. Note that information pertaining to the yellow light running frequency is stored in the memory 32 in a form that can be referenced and updated by the yellow-light-run determination unit 17.

1-11. Yellow-Light-Stop Determination Unit

The yellow-light-stop determination unit 18 determines the vehicle 3 has stopped at a yellow light if the traffic signal installed at the traffic signal installation point is yellow when the vehicle 3 stops at the traffic signal installation point. Note that in the present embodiment, the vehicle 3 stopping at the traffic signal installation point means that the vehicle speed of the vehicle 3 has become zero in the stop supplement zone A2. Further note that the determination regarding whether the vehicle speed has become zero is made based on information regarding the vehicle speed of the vehicle 3, which is detected by the distance sensor 43 and input to the host vehicle position information acquisition unit 12. If it is determined that the vehicle 3 has stopped at the traffic signal installation point, the traffic signal information for the traffic signal at that time is acquired from the traffic signal information acquisition unit 8. Then, if the traffic signal is yellow, the yellow-light-stop determination unit 18 determines that the vehicle 3 has made a stop at a yellow light. If a yellow light stop is determined, the yellow-light-stop determination unit 18 updates and adds 1 to a yellow light stopping frequency, which is the number of times the vehicle 3 stopped at a yellow light. Note that information pertaining to the yellow light stopping frequency is stored in the memory 32 in a form that can be referenced and updated by the yellow-light-stop determination unit 18.

Further note that in the present embodiment, if the preceding vehicle detection unit 7 detects that another vehicle 3 is present ahead within the predetermined distance in the traveling direction of the vehicle 3 at the time the vehicle 3 stops at the traffic signal installation point, the yellow-light-stop determination unit 18 determines that the vehicle 3 has not stopped at a yellow light even though the traffic signal is yellow.

In addition, the determination regarding whether the vehicle 3 has stopped at the traffic signal installation point may be made based on whether the vehicle speed of the vehicle 3 has become zero in a zone different from the stop supplement zone A2. For example, using the traffic signal installation point as a point of origin, the length of such a zone set in front of the traffic signal installation point may be a value selected from 10 meters to 100 meters that is different from the length of the stop supplement zone A2.

1-12. Notification Processing Unit

The notification processing unit 16 functions as a stop supplement unit that performs a stop supplementary operation with respect to the driver, i.e., cautions the driver, if predetermined conditions are met. In the present embodiment, if the notification processing unit 16 receives information from the red light determination unit 15 that indicates a red light encounter, the notification processing unit 16 acquires the current accelerator operation amount of the vehicle 3 from the driving condition acquisition unit 14. Based on the accelerator operation amount, the notification processing unit 16 determines whether the driver's operation is suitable in terms of stopping the vehicle 3 at the red light. If it is determined that the operation is not suitable, the notification processing unit 16 cautions the driver using voice guidance through the audio output device 48. Information regarding the caution given as a stop supplementary operation is output to the percentage calculation unit 22 to be described later.

More specifically, if the accelerator operation amount of the vehicle 3 at the red light encounter is equal to or greater than a predetermined value, the notification processing unit 16 gives a caution using voice guidance through the audio output device 48. Note that the predetermined value is preferably set to below an accelerator operation amount for maintaining the vehicle running at a constant speed, e.g. the predetermined value may be set to an accelerator operation amount of zero. As other examples, an accelerator operation amount of 0% or 10% may be set as the predetermined value, and may be changed as appropriate. In the present embodiment, the predetermined value is set as 0%. If the accelerator operation amount is not zero, then the driver is cautioned. Meanwhile, if the accelerator operation amount at the red light encounter is not greater than the predetermined value, the notification processing unit 16 determines that a suitable driving operation is being performed and does not give a caution using voice guidance. Note that when cautioning the driver, a configuration that provides guidance using characters or icons displayed via the display input device 47, or a configuration that combines voice guidance and guidance using displayed characters or icons may be used.

The notification processing unit 16 is configured so as to repeatedly determine whether to caution the driver each time information indicating a red light encounter is received from the red light determination unit 15 while the vehicle 3 is in the stop supplement zone A2 set in front of the traffic signal installation point. Once a caution is given, i.e., a stop supplementary operation is performed, the determination in the stop supplement zone A2 is ended, and no determination is made by the notification processing unit 16 until the vehicle 3 again approaches another traffic signal installation point.

At a red light encounter, the notification processing unit 16 stops making the above determination in the stop supplement zone A2 if information is received from the preceding vehicle detection unit 7 indicating that another vehicle 3 is present ahead within the predetermined distance. In addition, the notification processing unit 16 outputs such information to the percentage calculation unit 22 so that the stop supplement zone A2 is excluded from the calculation of the stop supplement percentage.

The notification processing unit 16 may be configured so as to provide guidance regarding the installation of a traffic signal ahead or guidance regarding the display status of a traffic signal ahead when the vehicle 3 passes the determination position A1 or when the vehicle enters the stop supplement zone A2. Furthermore, in addition to the above guidance, the notification processing unit 16 may also communicate accident information, which is point information pertaining to the traffic signal installation points. Such accident information is received from the central control server 2 through the transmitter-receiver unit 11, and is acquired by the point information acquisition unit 19 that includes the accident information acquisition unit 20. If the accident information is stored associated with the map data 34 in the map database 31, the accident information acquisition unit 20 may be configured so as to read out and acquire the accident information from the map database 31.

1-13. Percentage Calculation Unit

The percentage calculation unit 22 calculates the stop supplement percentage as a ratio of the stop supplement frequency, which is the number of times the driver is cautioned, i.e., the stop supplementary operation is performed, to the red light encounter frequency, which is the number of times the vehicle 3 has the red light encounter. In the present embodiment, information pertaining to the red light encounter frequency, the stop supplement frequency, and the stop supplement percentage is stored in the memory 32 in a form that can be referenced and updated by the percentage calculation unit 22.

If information indicating that the vehicle 3 will encounter a red light is received from the red light determination unit 15, the percentage calculation unit 22 updates the red light encounter frequency. Note that when the red light encounter frequency is updated once, the red light encounter frequency is not updated again until the vehicle 3 leaves the stop supplement zone A2. In addition, if information indicating that a caution has been given, i.e., the stop supplementary operation has been performed, is received from the notification processing unit 16, the percentage calculation unit 22 updates the stop supplement frequency. When the red light encounter frequency and the stop supplement frequency are updated, the percentage calculation unit 22 calculates the stop supplement percentage as the ratio of the stop supplement frequency to the red light encounter frequency. In the present embodiment, the stop supplement percentage is updated to the latest stop supplement percentage each time the red light encounter frequency and the stop supplement frequency are updated in line with the travel of the vehicle 3.

Note that in the present embodiment, as described below, a correction is made when calculating the stop supplement percentage if information is received indicating that the traffic signal installed at the traffic signal installation point ahead is red when the vehicle 3 passed the determination position A1.

If the percentage calculation unit 22 receives information from the red light determination unit 15 indicating that the traffic signal installed in the traffic signal installation point ahead is red when the vehicle 3 passed the determination position A1, the percentage calculation unit 22 corrects the stop supplement percentage to a higher value if the stop supplementary operation is performed in the stop supplement zone A2 that corresponds to the traffic signal. In the present embodiment, the percentage calculation unit 22 makes a correction so that the stop supplement frequency is larger than normal. This is then used as the basis for correcting the calculated stop supplement percentage to a higher value. This correction is performed using a correction coefficient as explained below.

The correction coefficient is a parameter stored in the memory 32, and the value of the correction coefficient is set based on the correction rules 40 also stored in the memory 32. Based on the information regarding whether the traffic signal is red when the vehicle 3 passed the determination position A1 received from the red light determination unit 15, the percentage calculation unit 22 sets the correction coefficient in accordance with the correction rules 40. Note that in the present embodiment, the correction rules 40 set the correction coefficient to 1.2 if the traffic signal is red when the vehicle 3 passes the determination position A1, and set the correction coefficient to 1.0 if the traffic signal is not red. Further note that the above numerical values 1.2 and 1.0 are merely examples, and how the correction coefficient is set in each case may be changed as appropriate.

To update the stop supplement frequency, the percentage calculation unit 22 adds the product of 1 and the correction coefficient to the pre-update stop supplement frequency. No correction is made when updating the red light encounter frequency, and the red light encounter frequency is updated by adding 1 to the pre-update red light encounter frequency. By updating the stop supplement frequency and the red light encounter frequency as explained above, in the case that the traffic signal is red when the vehicle 3 passes the determination position A1, the increment of the stop supplement frequency is corrected so as to become larger if the stop supplementary operation is performed. Consequently, the stop supplement percentage that is a ratio of the stop supplement frequency to the red light encounter frequency can be corrected so as to increase.

The percentage calculation unit 22 calculates the stop supplement percentage, which is a ratio of the stop supplement frequency to the red light encounter frequency, using Equation (1) below.

$$\text{Stop supplement percentage}(\%)=(\text{stop supplement frequency})/(\text{red light encounter frequency})\times 100 \quad (1)$$

The stop supplement percentage calculated in this manner represents a ratio indicating that the driver's operation was not suitable in terms of stopping the vehicle 3 at the traffic signal installation point during the red light encounter. Conversely, if the stop supplement percentage is X %, then the percentage expressed as (100−X) % represents a ratio indicating that the driver's operation was suitable in terms of stopping the vehicle 3 at the traffic signal installation point during the red light encounter. Thus, a smaller stop supplement percentage results in an evaluation of safer driving.

In the present embodiment, the percentage calculation unit 22 also corrects the stop supplement percentage based on the yellow light running frequency and the yellow light stopping frequency. The stop supplement percentage is updated to the latest stop supplement percentage each time the yellow light stopping frequency and the yellow light running frequency are updated. More specifically, the yellow-light-stop percentage is calculated based on Equation (2) below, and the stop supplement percentage is updated by subtracting the product of the yellow light stopping frequency and a predetermined coefficient from the stop supplement percentage. Note that information pertaining to the predetermined coefficient is included in the correction rules 40 stored in the memory 32.

$$\text{Yellow-light-stop percentage}(\%)=(\text{yellow light stopping frequency})/(\text{yellow light stopping frequency}+\text{yellow light running frequency})\times 100 \quad (2)$$

Note that the correction rules 40 referenced by the percentage calculation unit 22 can be updated using update information received from the central control server 2. Such update processing is performed by the update processing unit 30. Namely, if the update processing unit 30 receives update information regarding the correction rules 40 from the central control server 2 through the transmitter-receiver unit 11, the update processing unit 30 updates the correction rules 40 stored in the memory 32 based on the update information. Accordingly, the rules may be changed as needed so as to set the stop supplement percentage to a more suitable value based on the total points thus far acquired (described later), the driver's skill level, driving history, and the like.

1-14. Evaluation Information Acquisition Unit

Figure 4:
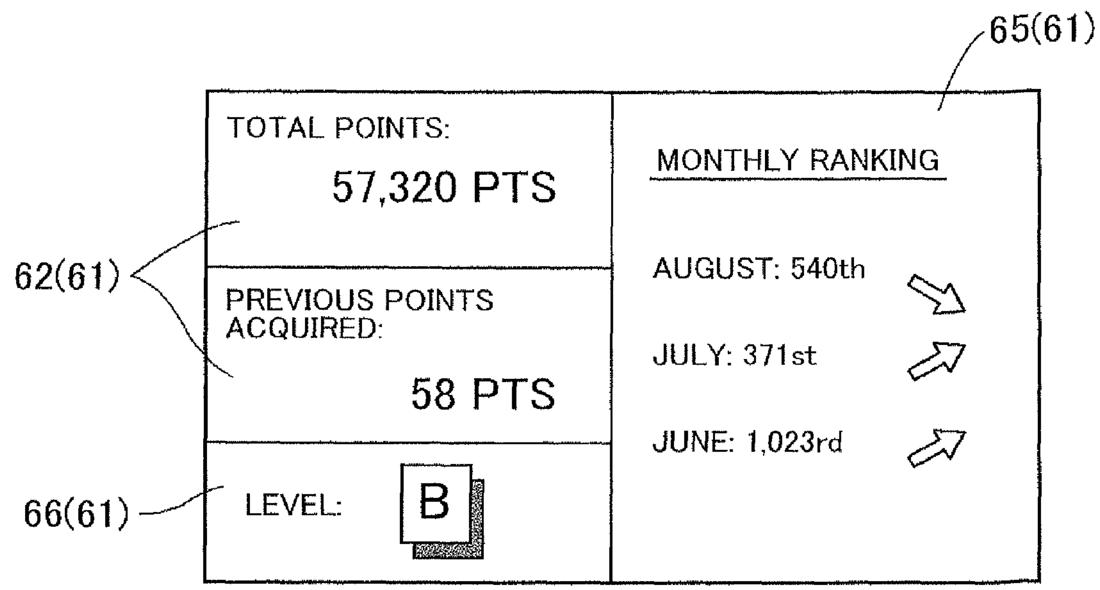
FIG. 4 is a drawing that shows an example of a total evaluation screen that displays evaluation information acquired by an evaluation information acquisition unit.
Figure 5:
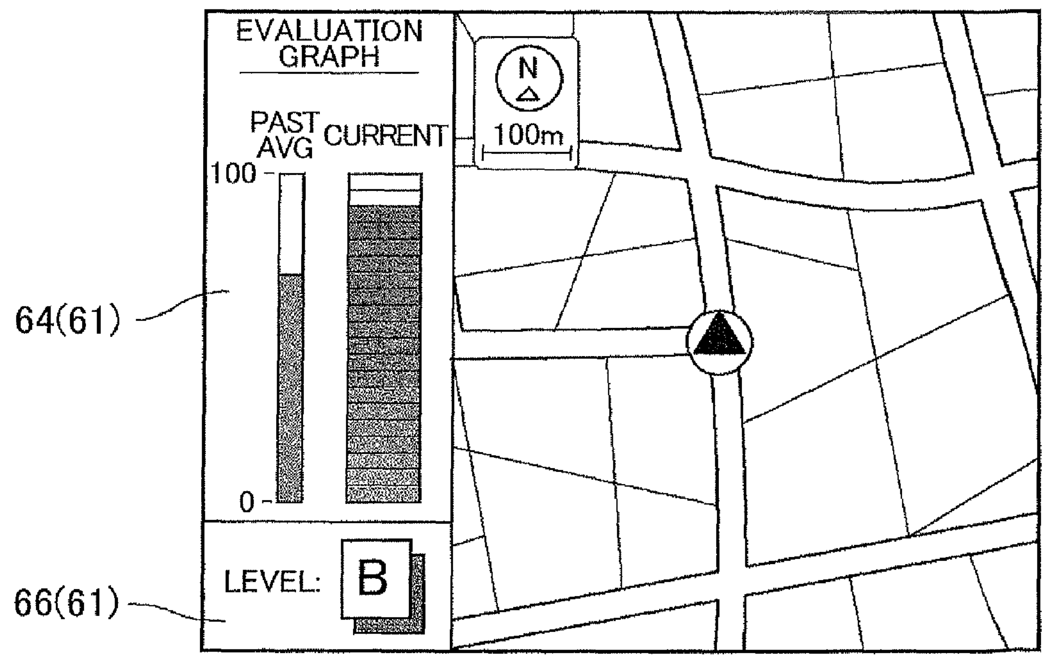
FIG. 5 is a drawing that shows an example of a guidance screen that displays evaluation graph information for sequentially showing changes in a stop supplement percentage during travel.

The evaluation information acquisition unit 23 acquires the evaluation information 61 based on the stop supplement percentage calculated by the percentage calculation unit 22. As shown in FIG. 1, the evaluation information acquisition unit 23 here includes a point calculation unit 24, a graph generation unit 25, an advice acquisition unit 26, and an external information acquisition unit 27. As the evaluation information 61, the evaluation information acquisition unit 23 acquires point information 62, advice information, evaluation graph information 64, the ranking information 65, and the level information 66. In addition, the point rules 38 and the advice data 37 referenced by the evaluation information acquisition unit 23 are stored in the memory 32. FIGS. 4 and 5 show an example of a screen displaying the evaluation information 61 acquired by the evaluation information acquisition unit 23 on the display input device 47. Note that the advice information is not shown. Here, FIG. 4 is an example of a total evaluation screen for displaying a result of a comprehensive evaluation regarding the stop supplement percentage thus far, and FIG. 5 is an example of a guidance screen that display the evaluation graph information 64 for sequentially showing changes in the stop supplement percentage during travel of the vehicle 3. Note that the example of FIG. 5 shows the level information 66 and a guidance map for route guidance in addition to the evaluation graph information 64.

The point calculation unit 24 calculates points to be assigned in accordance with the stop supplement percentage. At such time, the point calculation unit 24 refers to the point rules 38 stored in the memory 32, and calculates the points to be assigned based on the point rules 38. The point rules 38 are rules that specify the relationship between the stop supplement percentage calculated by the percentage calculation unit 22 and the assigned points. As an example, in the point rules 38 of the present embodiment, the stop supplement percentage is designated as X % and (100−X) % calculated. The point rules 38 also specify that 1 point is assigned for every 1%. However, if correcting the stop supplement frequency for calculating the stop supplement percentage causes the stop supplement percentage to exceed 100%, with the stop supplement percentage calculated by the percentage calculation unit 22 per trip between turning the main power source of the vehicle 3 on and off, then zero points are assigned (i.e., no points are assigned). Alternatively, after finding (X−100) %, 1 point may be subtracted for every 1%. Conversely, the stop supplement percentage calculated by the percentage calculation unit 22 per trip between turning the main power source of the vehicle 3 on and off may fall below 0%. For example, if the stop supplement frequency is small and the yellow light stopping frequency is large, the stop supplement percentage may fall below 0%. In such case, the rules may specify that 100 points are assigned, or more than 100 points assigned.

The point calculation unit 24 also integrates the points per trip calculated as described above and calculates the total points acquired thus far. The total points may be integrated and summed per prescribed period, e.g. every year, and then reset to zero once the year changes and integrated again. Alternatively, the total points may be an integrated value of the total points acquired thus far. The points per trip and total points calculated by the point calculation unit 24 are stored in the memory 32 as vehicle point data 39. In addition, based on the vehicle point data 39 stored in the memory 32, the point calculation unit 24 displays the point information 62, which represents the total points and points that were acquired from previous travel (previously acquired points), on the display input device 47. In the example shown in FIG. 4, such point information 62 is displayed in part of the total evaluation screen.

The point rules 38 referenced by the point calculation unit 24 can be updated using update information received from the central control server 2. Such update processing is performed by the update processing unit 30. Namely, if the update processing unit 30 receives update information regarding the point rules 38 from the central control server 2 through the transmitter-receiver unit 11, the update processing unit 30 updates the point rules 38 stored in the memory 32 based on the update information. Accordingly, the rules may be changed as needed so that the assigned points become a more appropriate value, or changed so as to increase the assigned points for a limited time. Further note that the content of the point rules 38 above is merely one example, and any content may be set for the rules as appropriate. Therefore, the point rules 38 may be suitably set such that the assigned points vary depending on the distance traveled by the vehicle 3 per trip even though the stop supplement percentage is the same.

The graph generation unit 25 generates a graph display that visually represents a safe driving percentage at certain times. The safe driving percentage is derived from the stop supplement percentage and represents the ratio of safe driving performed at traffic signal installation points. The safe driving percentage (%) is calculated as (100−X) %, where X % is the stop supplement percentage. However, if a correction causes the stop supplement percentage to exceed 100%, the safe driving percentage is set to 0%; if the stop supplement percentage falls below 0%, the safe driving percentage is set to 100%. Specifically, the graph generation unit 25 generates the evaluation graph information 64 for sequentially showing changes in the safe driving percentage during travel of the vehicle 3, as illustrated in FIG. 5. The graph generation unit 25 also displays the generated evaluation graph information 64 on the display input device 47. The evaluation graph information 64 includes a graph of the current value of the safe driving percentage and a graph of the past average value of the safe driving percentage. These graphs are arranged side by side so they can be compared against one another. Here, the graph of the current value of the safe driving percentage displays the safe driving percentage for a route traveled after turning on the main power source until the current time, and is sequentially updated as the vehicle 3 travels. The graph of the past average value of the safe driving percentage displays the average value of past information regarding the safe driving percentage for routes traveled between turning the main power source on and off, and the value is updated for each trip of the vehicle 3. Both graphs are shown in the example as bar graphs. Note that information stored in the navigation device 1 or stored per vehicle 3 in the central control server 2 may be used as the information regarding past safe driving percentages.

The advice acquisition unit 26 acquires advice information with content that corresponds to the stop supplement percentage. Here, the advice acquisition unit 26 reads out and acquires advice information with content that corresponds to the stop supplement percentage from the advice data 37 stored in the memory 32. The advice acquisition unit 26 also displays the acquired advice information on the display input device 47. The advice information is statement information for communicating to the driver evaluation content that corresponds to the stop supplement percentage. For example, if the stop supplement percentage is low, a statement commending this fact is acquired as the advice information. Meanwhile, if the stop supplement percentage is high, a statement encouraging the driver to have a higher awareness of safe driving when driving through a traffic signal installation point is acquired as the advice information.

The advice data 37 stored in the memory 32 can be updated using update information received from the central control server 2. Such update processing is performed by the update processing unit 30. Namely, if the update processing unit 30 receives update information regarding the advice data 37 from the central control server 2 through the transmitter-receiver unit 11, the update processing unit 30 updates the advice data 37 stored in the memory 32 based on the update information. Accordingly, the content of the advice information may be changed as needed to more suitable content by changing the content of the advice information depending on the driving history or driving habits of the driver, for example.

The external information acquisition unit 27 executes a process to acquire the evaluation information 61 from the central control server 2, which is provided outside the vehicle 3. More specifically, the external information acquisition unit 27 communicates with the central control server 2 through the transmitter-receiver unit 11, and receives the evaluation information 61 generated by comparing the ranking information 65 and level information 66 of other vehicles 3. As described later, the central control server 2 is provided in communication with the navigation devices 1 installed in the plurality of vehicles 3, and collects and sums information regarding the stop supplement percentage from the plurality of vehicles 3. In the present embodiment, the central control server 2 collects from the navigation device 1 of each vehicle 3 and sums information regarding the points assigned depending on the stop supplement percentage, as well as information regarding the red light encounter frequency, the post-correction stop supplement frequency, the yellow light stopping frequency, and the yellow light running frequency, which serve as source information for calculating the stop supplement percentage. Using the sum result, the central control server 2 then generates the ranking information 65 and the level information 66. The external information acquisition unit 27 of the navigation devices 1 request and acquire the ranking information 65 and the level information 66 generated in this manner from the central control server 2 at a predetermined timing. In the present embodiment, the external information acquisition unit 27 requests the ranking information 65 and the level information 66 from the central control server 2 when the main power source of the vehicle 3 mounted with the navigation device 1 is turned on.

The ranking information 65 indicates the ranking of the vehicles 3 as compared to other vehicles 3 in terms of the stop supplement percentage or the safe driving percentage that was calculated based on this. The ranking information 65 may be information regarding a ranking of average values for the stop supplement percentage of the vehicles 3 within a predetermined period, or a ranking of the total points acquired by the vehicles 3 within a predetermined period. Here, various periods may be set as the predetermined period, such as one year, one month, one week, or one day. The external information acquisition unit 27 also displays the acquired ranking information 65 on the display input device 47. In the present embodiment, as shown in the example of FIG. 4, the ranking information 65 includes a ranking of the point totals acquired every month by each vehicle 3 compared to other vehicles 3, and arrow images that indicate whether the ranking has increased or decreased compared to the previous month.

The level information 66 indicates the level assigned based on the past stop supplement percentage of each vehicle 3 as compared to other vehicles 3 or the safe driving percentage that was calculated based on this. The level information 66 may be information regarding the level to which each vehicle 3 belongs when the vehicles 3 are divided into a plurality of levels depending on the ranking of average values for the stop supplement percentage of the vehicles 3 within a predetermined period, the ranking of the total points acquired by the vehicles 3 within a predetermined period, or the total points acquired by the vehicles 3 thus far. In the present embodiment, the level information 66 is determined by raising or lowering the current level depending on the ranking of the total points acquired in a predetermined period (e.g. in one year). Here, the categories of A, B, C and so on, or the categories of 1, 2, 3 and so on may be used as levels. The external information acquisition unit 27 also displays the acquired level information 66 on the display input device 47. In the present embodiment, as shown in the example of FIG. 4, the level information 66 uses the levels of A, B, C and so on, and the example in the figure indicates that the vehicle 3 resides at the B level.

1-15. Main Power Source Monitoring Unit

The main power source monitoring unit 28 monitors the state of a main power source switch 4 of the vehicle 3. A state in which the main power source switch 4 is on and power is supplied to the components of the vehicle 3 is determined as an on state of the main power source. A state in which the main power source switch 4 is off and power is not supplied to the components of the vehicle 3 is determined as an off state of the main power source.

1-16. Send Processing Unit

The send processing unit 29 executes a process to send information regarding the stop supplement percentage to the central control server 2 at a predetermined timing. More specifically, when the main power source of the vehicle 3 installed with the navigation device 1 is turned off, the send processing unit 29 executes a process to send information regarding the stop supplement percentage between turning the main power source on and off to the central control server 2. The on/off status of the main power source is determined by the main power source monitoring unit 28. In the present embodiment, the send processing unit 29 sends to the central control server 2 information regarding the point information per trip assigned depending on the stop supplement percentage between turning the main power source on and off, as well as information regarding the red light encounter frequency, the post-correction stop supplement frequency, the yellow light stopping frequency, and the yellow light running frequency, which serve as source information for calculating the stop supplement percentage.

2. Configuration of Central Control Server

The configuration of the central control server 2 will now be described. As shown in FIG. 2, the central control server 2 is provided in communication with the plurality of navigation devices 1 that are respectively installed in the plurality of vehicles 3. The central control server 2 collects and sums information regarding the stop supplement percentage from the navigation devices 1, and generates the evaluation information 61 for the navigation devices 1 based on the summed information. The central control server 2 also distributes the generated evaluation information 61 in accordance with requests from the navigation devices 1.

The components of the central control 2 shown in FIG. 2 each have as its core member a computation processing device such as a CPU or the like that is one of mutually shared and independently utilized. Each component executes various processes on received data that may be implemented by hardware, software (a program), or via a combination of both hardware and software. In the present embodiment, the central control server 2 includes a transmitter-receiver unit 52, a storage processing unit 53, a sum processing unit 54, and a distribution processing unit 55. Each component is also configured to exchange information with the other components via wireless communication using a digital transfer bus or the like. If each component is implemented through software (a program), the software is stored in a storage unit such as a RAM or ROM to which the computation processing device can refer. A user database 51 also has a hardware configuration that includes a storage medium (a storage unit) that is capable of storing and re-writing information, such as a hard disk drive or a flash memory. The configuration of each component of the central control server 2 according to the present embodiment will be explained in detail below.

2-1. Transmitter-Receiver Unit

The transmitter-receiver unit 52 includes a communication device that sends data to the navigation device 1 installed in the plurality of vehicles 3 and receives data from the navigation device 1 by wireless communication via a wireless base station or the like. The wireless communication method is used in common by the transmitter-receiver unit 11 of the navigation device 1. As explained above, in the present embodiment, the transmitter-receiver unit 52 receives from the navigation device 1 information regarding the stop supplement percentage, more specifically, information regarding the points assigned depending on the stop supplement percentage, as well as information regarding the red light encounter frequency, the post-correction stop supplement frequency, the yellow light stopping frequency, and the yellow light running frequency, which serve as source information for calculating the stop supplement percentage. In addition, the transmitter-receiver unit 52 sends the evaluation information 61 that is based on a comparison with other vehicles 3, such as the ranking information 65 and the level information 66, to the navigation device 1. The transmitter-receiver unit 52 also sends the update information for updating the advice data 37, the point rules 38, and the correction rules 40 stored in the memory 32 of the navigation device 1.

2-2. Storage Processing Unit

The storage processing unit 53 executes a process to store information regarding the stop supplement percentage, which was received by the transmitter-receiver unit 52 from the navigation device 1 installed in each vehicle 3, in the user database 51 as sorted per vehicle 3. As explained above, in the present embodiment, the information regarding the stop supplement percentage includes information regarding the points assigned depending on the stop supplement percentage, as well as information regarding the red light encounter frequency, the post-correction stop supplement frequency, the yellow light stopping frequency, and the yellow light running frequency, which serve as source information for calculating the stop supplement percentage. Here, the information regarding the points assigned depending on the stop supplement percentage is specifically point information per trip that is assigned depending on the stop supplement percentage between turning the main power source on and off. Also, the information regarding the red light encounter frequency, the post-correction stop supplement frequency, the yellow light stopping frequency, and the yellow light running frequency is also information per trip between turning the main power source on and off. Such information is sent from the navigation device 1 as information per trip of the vehicle 3 when the main power source of the vehicle 3 is turned off, and received by the transmitter-receiver unit 52. The storage processing unit 53 stores information regarding the received stop supplement percentage in the user database 51 as associated with identification information for each vehicle 3 and information regarding the date and time received. Here, the identification information of the vehicles 3 may use the license plate numbers of the vehicles 3, or use identification codes of the navigation devices 1 or vehicles 3, for example.

2-3. Sum Processing Unit

The sum processing unit 54 executes a process to sum information regarding the stop supplement percentage for each vehicle 3 stored in the user database 51 and generate the evaluation information 61 for each vehicle 3 (each navigation device 1). Specifically, the sum processing unit 54 sums the point information per trip received from each vehicle 3 for each predetermined period and generates the ranking information 65 that represents the ranking of point totals comparing the plurality of vehicles 3. In the present embodiment, the sum processing unit 54 computes the total points acquired per month by each vehicle 3, and generates the ranking information 65 that represents the ranking as compared to other vehicles 3. Furthermore, the sum processing unit 54 sums the points acquired within a predetermined period by each vehicle 3, and generates the level information 66 that represents the level assigned in accordance with the sum result. In the present embodiment, the sum processing unit 54 determines the level of each vehicle 3 by raising the level for a higher rank or reducing the level for a lower rank depending on the ranking of the total points acquired in the predetermined period (e.g. in one year). Note that the level until the initial passage of the predetermined period may be set to any level, such as the lowest level or an intermediate level. The generated ranking information 65 and level information 66 are stored in the user database 51 as associated with the identification information of each vehicle 3.

The sum processing unit 54 also integrates information regarding the points per trip received from the vehicles 3 and calculates the total points acquired thus far. As explained above, the total points are an integrated value that is integrated per predetermined period, or an integrated value of all the points acquired thus far. Information regarding the calculated total points is stored in the user database 51 as associated with the identification information of each vehicle 3. Information regarding the total points thus stored in the user database 51 is used for backing up and confirming information regarding the total points stored in the memory 32 of each navigation device 1. Therefore, such information matches information regarding the total points stored in the memory 32 of the navigation device 1 as the vehicle point data 39.

2-4. Distribution Processing Unit

The distribution processing unit 55 executes a process to read out from the user database 51 the ranking information 65 and the level information 66, which serve as the evaluation information 61 generated by the sum processing unit 54, in response to a request from the external information acquisition unit 27 of each navigation device 1, and then sends such information to each navigation device 1. When update information is generated for updating the point rules 38 or the advice data 37 by an update information generation unit (not shown), the distribution processing unit 55 also executes a process to send such update information to the navigation device 1.

3. Procedure for Operation Processing

Figure 6:
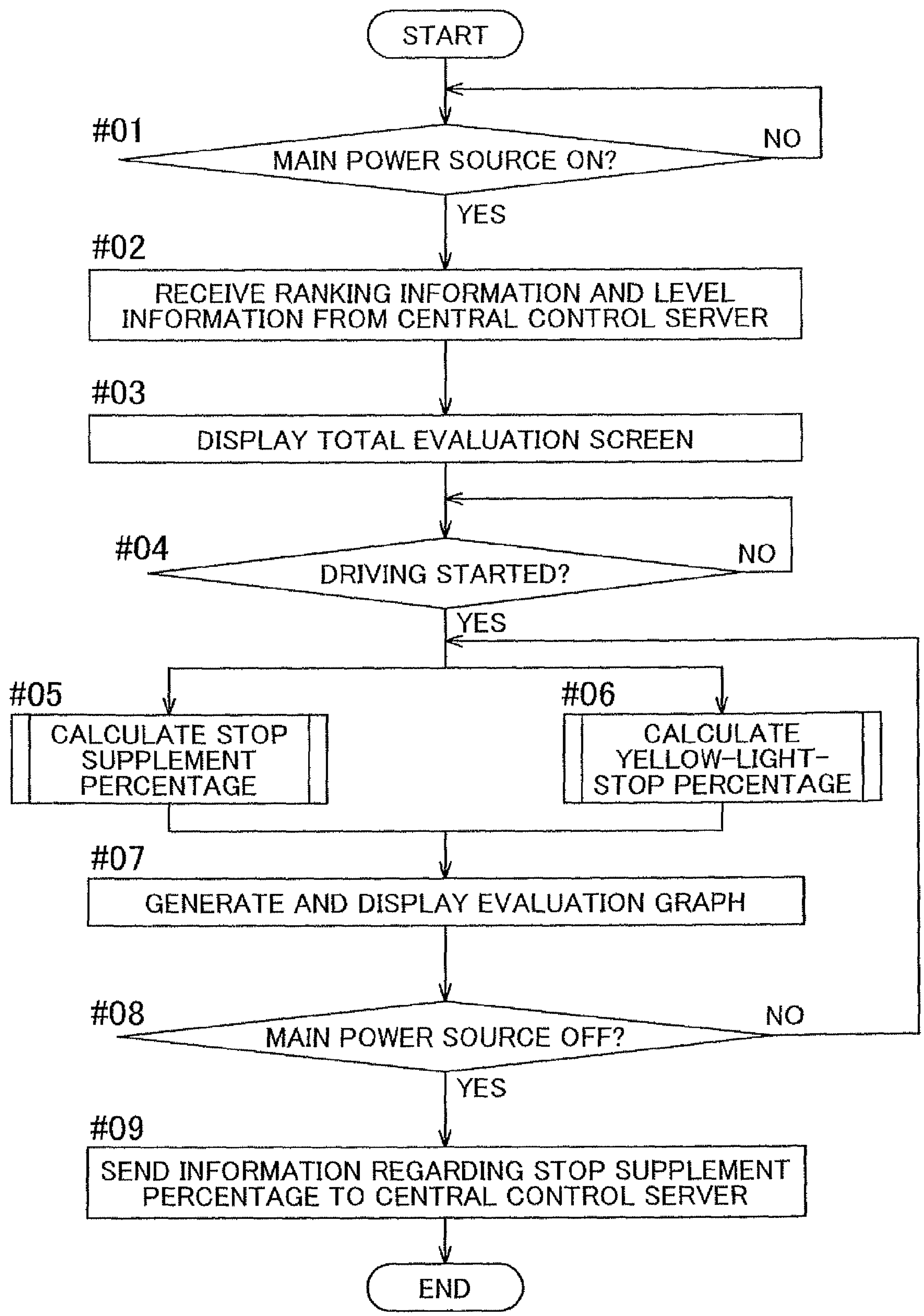
FIG. 6 is a flowchart that shows an overall procedure for a safe driving evaluation process according to the embodiment of the present invention.
Figure 7A:
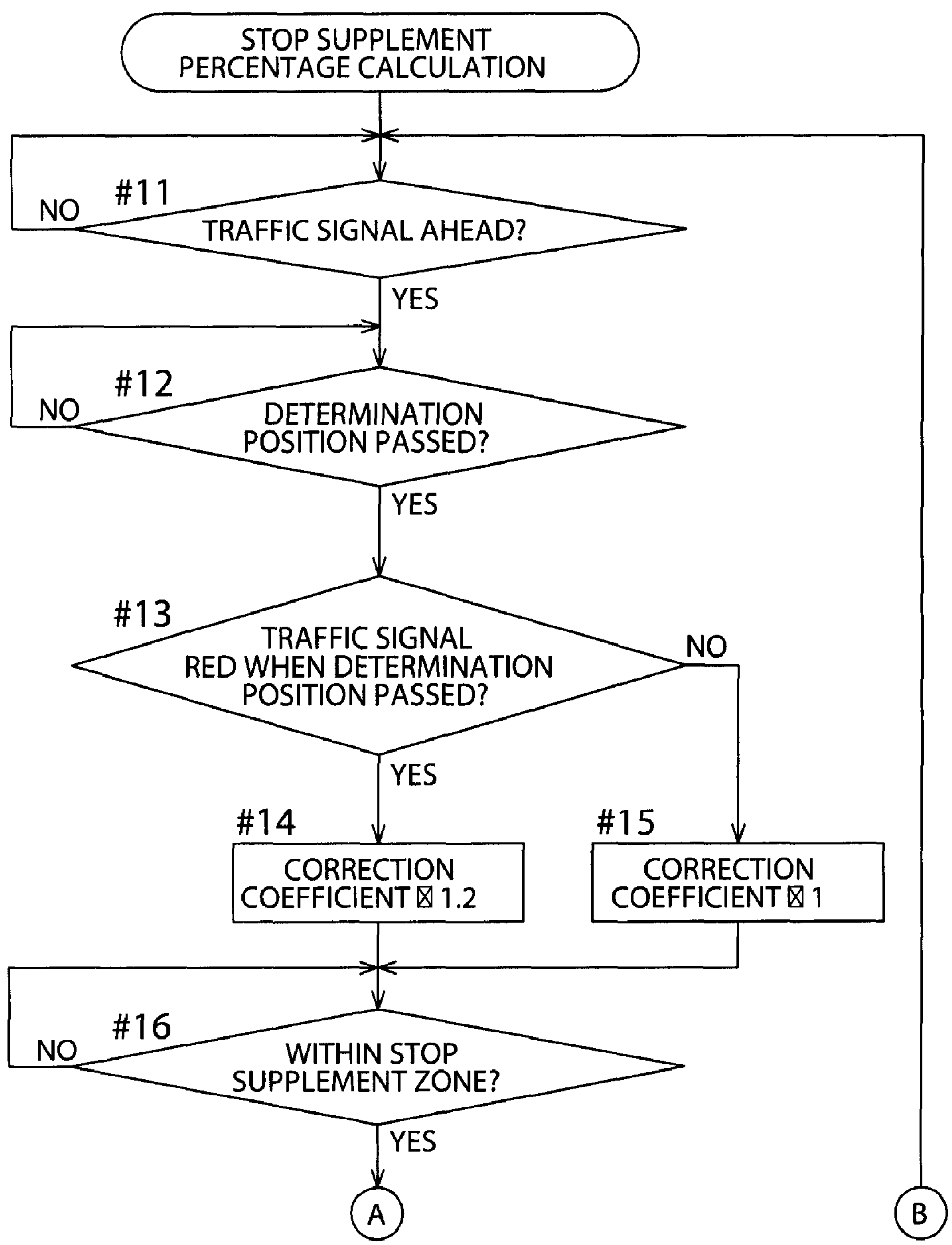
FIGS. 7A AND 7B are flowcharts that show a procedure for a stop supplement percentage calculation process.
Figure 7B:
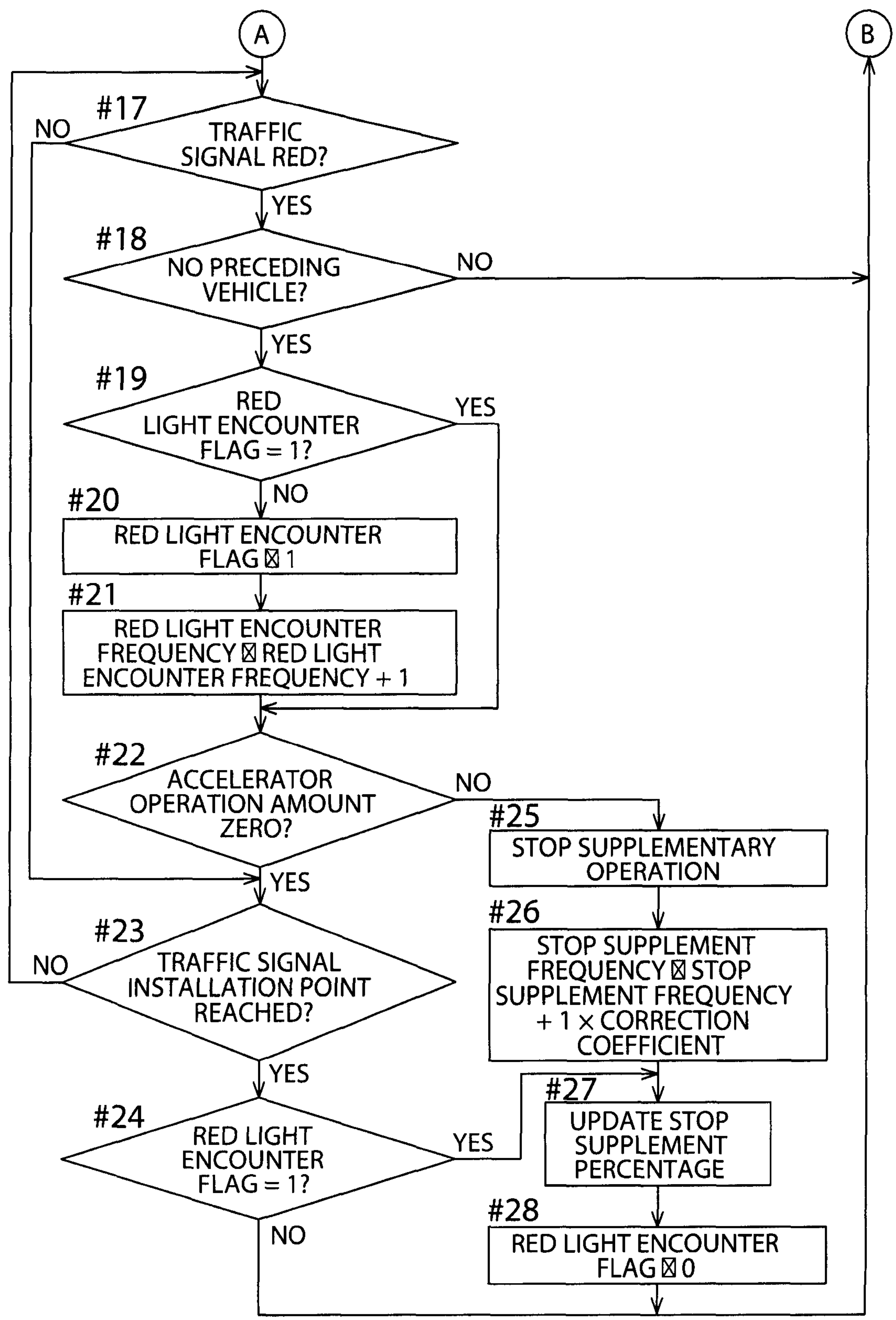
Figure 8:
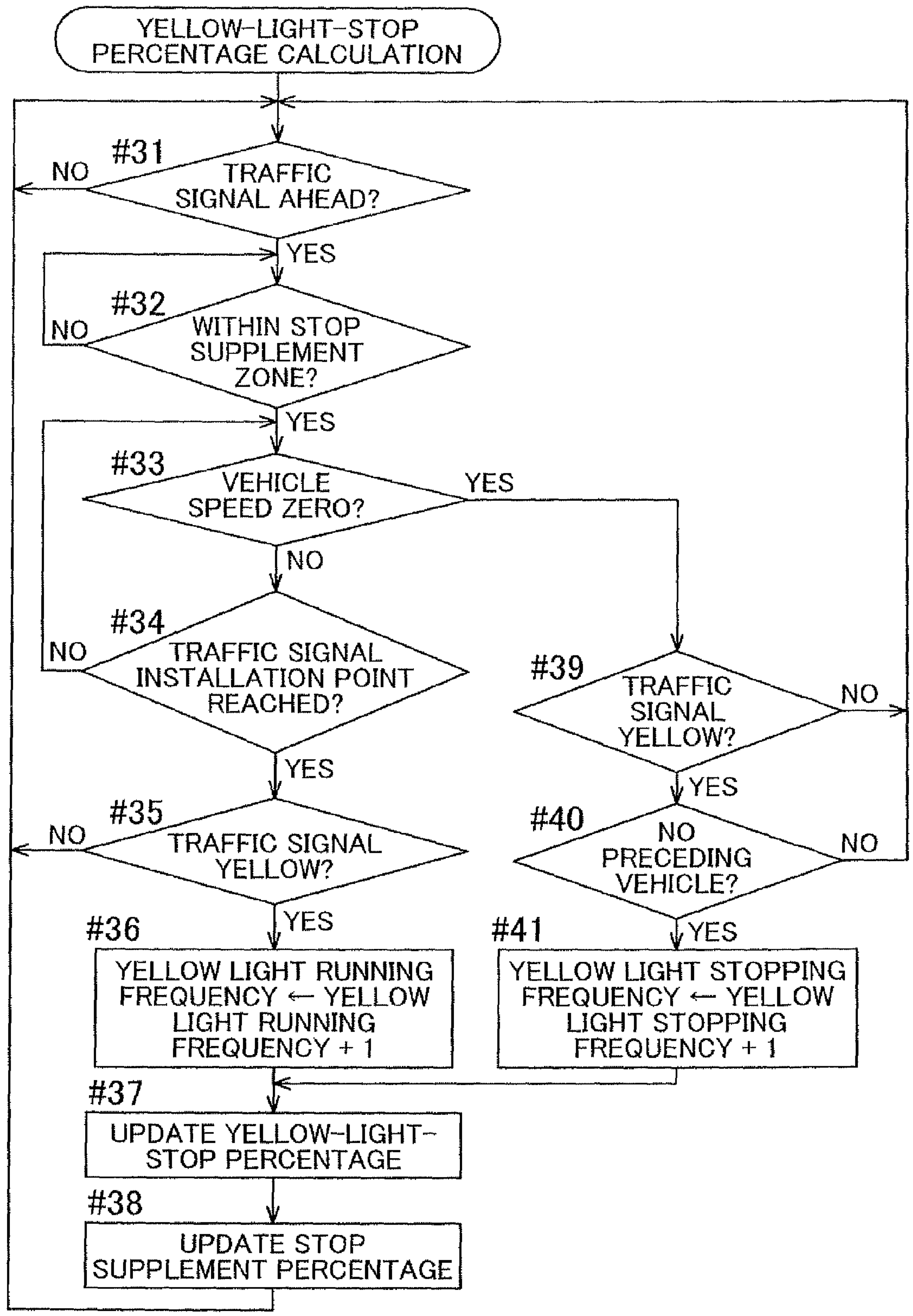
FIG. 8 is a flowchart that shows a procedure for a yellow-light-stop percentage calculation process.

Next, a procedure for a safe driving evaluation process (a safe driving evaluation method) that is executed in the navigation device 1 according to the present embodiment will be explained. FIG. 6 is a flowchart that shows an overall procedure for the safe driving evaluation process according to the present embodiment. FIGS. 7A and 7B are flowcharts that show a procedure for a stop supplement percentage calculation process at #05 of FIG. 6. FIG. 8 is a flowchart that shows a procedure for a yellow-light-stop percentage calculation process at #06 of FIG. 6. The description below will follow the flowcharts.

3-1. Overall Procedure for Safe Driving Evaluation Processing

The overall procedure for the safe driving evaluation processing will now be described. As shown in FIG. 6, if the main power switch 4 of the vehicle 3 installed with the navigation device 1 is turned on (YES at #01), the external information acquisition unit 27 requests the ranking information 65 and the level information 66, which serve as the evaluation information 61 for the vehicle 3, from the central control server 2, and receives the information (#02). The total evaluation screen is then displayed (#03). As shown in FIG. 4, the total evaluation screen includes a display of the point information 62 that indicates the points acquired during previous travel (previously acquired points) and the total points, as well as a display of the ranking information 65 and the level information 66. Note that, although not shown in the figure, the advice information is also displayed together with the above information. Here, the point information 62 is calculated by the point calculation unit 24 and acquired from the vehicle point data 39 stored in the memory 32. The advice information is acquired by the advice acquisition unit 26 reading out advice information with content that corresponds to the stop supplement percentage during previous travel from the advice data 37 stored in the memory 32. The ranking information 65 and the level information 66 are received and acquired from the central control server 2 at #02. The total evaluation screen is formed by arranging the above information in accordance with a predetermined format.

If the vehicle 3 has started traveling (YES at #04), the percentage calculation unit 22 executes a process to calculate the stop supplement percentage (#05), and executes a process to calculate the yellow-light-stop percentage (#06). The stop supplement percentage calculation processing and the yellow-light-stop percentage calculation processing will be described in detail later based on the flowcharts in FIGS. 7A, 7B, and 8. Next, the graph generation unit 25 generates and displays the evaluation graph information 64 (#07). As shown in FIG. 5, the evaluation graph information 64 is a graph display that visually represents the safe driving percentage derived from the stop supplement percentage at certain times. The evaluation graph information 64 includes a graph of the current value of the safe driving percentage and a graph of the past average value of the safe driving percentage. The processing at #05, #06, and #07 is repeatedly executed until the main power source is turned off. Accordingly, once the main power source of the vehicle 3 is turned on, until the main power source is turned off (NO at #08), the stop supplement percentage at certain times is calculated as needed and the evaluation graph information 64 that shows the safe driving percentage at certain times is displayed on the display input device 47.

If the main power source is subsequently turned off (YES at #08), the send processing unit 29 sends information regarding the stop supplement percentage between turning the main power source on and off to the central control server 2 (#09). Here, as explained above, the information regarding the sent stop supplement percentage includes the point information per trip, as well as information regarding the red light encounter frequency, the post-correction stop supplement frequency, the yellow light stopping frequency, and the yellow light running frequency, which serve as source information for calculating the stop supplement percentage. The point information per trip in such case is information regarding the points assigned depending on the stop supplement percentage between turning the main power source on and off. Note that the stop supplement percentage between turning the main power source on and off is equivalent to the stop supplement percentage at certain times as calculated at #05 and #06 before the main power source is turned off. The overall procedure of the safe driving evaluation processing is then ended.

3-2. Procedure for Stop Supplement Percentage Calculation Processing

The procedure for the stop supplement percentage calculation processing at #05 in FIG. 6 will be described next. As shown in FIGS. 7A and 7B, if there is a traffic signal ahead of the vehicle 3 installed with the navigation device 1 (YES at #11), the zone determination unit 10 determines whether the vehicle 3 has passed the determination position A1 (#12). If the vehicle 3 has passed the determination position A1 (YES at #12), the red light determination unit 15 acquires the traffic signal information for the traffic signal ahead from the traffic signal information acquisition unit 8 and determines whether the traffic signal was red when the vehicle 3 passed the determination position A1 (#13). If a red light is determined at #13 (YES at #13), the percentage calculation unit 22 sets the correction coefficient to 1.2 (#14). However, if a red light is not determined at #13 (NO at #13), the percentage calculation unit 22 sets the correction coefficient to 1.0 (#15). Next, the zone determination unit 10 proceeds to determine whether the vehicle 3 is inside the stop supplement zone A2 (#16).

If the vehicle 3 is inside the stop supplement zone A2 (YES at #16), the red light determination unit 15 acquires the traffic signal information for the traffic signal ahead from the traffic signal information acquisition unit 8 and determines whether the traffic signal is red (#17). The determinations at #16 and #17 make it possible to determine whether the vehicle 3 will have a red light encounter. If a red light is determined at #17 (YES at #17), it is then determined whether another vehicle 3 is ahead within a predetermined distance of the vehicle 3 (#18). If it is determined that another vehicle 3 is ahead of the vehicle 3 (NO at #18), the process returns to #11 and the evaluation of the driving operation in the stop supplement zone A2 is cancelled. However, if it is determined that another vehicle 3 is not ahead of the vehicle 3 (YES at #18), it is then determined whether a red light encounter flag is set to 1 (#19). The red light encounter flag is used for distinguishing whether a determination of a red light encounter is a first red light encounter for that particular traffic signal. Use of the red light encounter flag prevents the red light encounter frequency from being repeatedly updated for the same traffic signal. If the red light encounter flag is not set to 1 (NO at #19), the red light encounter flag is set to 1 (#20), the red light encounter frequency is updated by adding 1 (#21), and it is determined whether the accelerator operation amount is zero (#22). However, if the red light encounter flag is set to 1 (YES at #19), the red light encounter frequency is not updated and it is determined whether the accelerator operation amount is zero (#22).

If it is determined at #22 that the accelerator operation amount is zero (YES at #22), it is then determined whether the vehicle 3 has reached the traffic signal installation point (#23). Note that even if a red light is not determined at #17 (NO at #17), a determination is still made regarding whether the vehicle 3 has reached the traffic signal installation point (#23). If the vehicle 3 has not reached the traffic signal installation point (NO at #23), the process returns to determining whether the traffic signal is red (#17). However, if the vehicle 3 has reached the traffic signal installation point (YES at #23), it is then determined whether the red light encounter flag is set to 1 (#24). If the red light encounter is set to 1 (YES at #24), namely, if a red light encounter occurs at least once inside the stop supplement zone A2, the red light encounter frequency is updated. Therefore, the percentage calculation unit 22 updates the stop supplement percentage (#27). The red light encounter flag is then reset to 0 (#28), and the process returns to #11. However, if the red light encounter flag is set to 0 (NO at #24), namely, if a red light encounter does not occur even once inside the stop supplement zone A2, the red light encounter frequency is not updated. There is thus no need to update the stop supplement percentage, and the process returns to #11.

If it is determined at #22 that the accelerator operation amount is not zero (NO at #22), namely, if the accelerator operation amount of the vehicle 3 is not zero despite the vehicle 3 encountering a red light, the notification processing unit 16 cautions the driver as a stop supplementary operation (#25), and the percentage calculation unit 22 adds the product of 1 and the correction coefficient to the stop supplement frequency to update the stop supplement frequency (#26). The percentage calculation unit 22 subsequently updates the stop supplement percentage (#27) and resets the red light encounter flag to 0 (#28), after which the process returns to #11.

After returning to #11, the process stands by until a traffic signal appears ahead of the vehicle 3 again (NO at #11). Once a traffic signal appears ahead of the vehicle 3 (YES at #11), the above processing is executed again. In other words, the above processing is repeatedly executed each time the vehicle 3 approaches a traffic signal installation point.

3-3. Procedure for Yellow-Light-Stop Percentage Calculation Processing

The procedure for the yellow-light-stop percentage calculation processing at #06 in FIG. 6 will be described next. As shown in FIG. 8, if there is a traffic signal ahead of the vehicle 3 installed with the navigation device 1 (YES at #31), the zone determination unit 10 determines whether the vehicle 3 is inside the stop supplement zone A2 (#32). If the vehicle 3 is inside the stop supplement zone A2 (YES at #32), the yellow-light-stop determination unit 18 acquires information pertaining to the vehicle speed of the vehicle 3 from the host vehicle position information acquisition unit 12 and determines whether the vehicle speed is zero (#33). If the vehicle speed is zero (YES at #33), the traffic signal information for the traffic signal ahead is acquired from the traffic signal information acquisition unit 8. If the traffic signal is not yellow (NO at #39), the process returns to #31. However, if the traffic signal is yellow (YES at #39), the yellow-light-stop determination unit 18 determines whether another vehicle 3 is ahead of the vehicle 3 based on the detection result of the preceding vehicle detection unit 7 (#40). If it is determined that another vehicle 3 is not ahead of the vehicle 3 (YES at #40), the yellow light stopping frequency is updated by adding 1 to the yellow light stopping frequency (#41). The percentage calculation unit 22 subsequently updates the yellow-light-stop percentage (#37) and updates the stop supplement percentage using the updated yellow-light-stop percentage (#38), after which the process returns to #31. However, if it is determined that another vehicle 3 is ahead of the vehicle 3 (NO at #40), the process returns to #31.

Meanwhile, if it is determined at #33 that the vehicle speed is not zero (NO at #33), it is then determined whether the vehicle 3 has reached the traffic signal installation point (#34). If the vehicle 3 has not reached the traffic signal installation point (NO at #34), the process returns to #33. However, if the vehicle 3 has reached the traffic signal installation point (YES at #34), the yellow-light-stop determination unit 17 acquires the traffic signal information for the traffic signal from the traffic signal information acquisition unit 8 and determines whether the traffic signal was yellow when the vehicle 3 reached the traffic signal installation point (#35). If the traffic signal was not yellow (NO at #35), the process returns to #31. However, if the traffic signal was yellow (YES at #35), the yellow-light-run determination unit 17 adds 1 to the yellow light running frequency to update the yellow light running frequency (#36). The percentage calculation unit 22 subsequently updates the yellow-light-stop percentage (#37) and updates the stop supplement percentage using the updated yellow-light-stop percentage (#38), after which the process returns to #31.

After returning to #31, the process stands by until a traffic signal appears ahead of the vehicle 3 again (NO at #31). Once a traffic signal appears ahead of the vehicle 3 (YES at #31), the above processing is executed again. In other words, the above processing is repeatedly executed each time the vehicle 3 approaches a traffic signal installation point.

Other Embodiments (1) In the embodiment described above, as an example, a case was explained in which the stop supplementary operation is performed if a traffic signal installed at a traffic signal installation point ahead is red when the vehicle 3 passes the determination position A1. In order to correct the stop supplement percentage to a higher value if the stop supplementary operation is performed, the stop supplement frequency that is the numerator of Equation (1) for calculating the stop supplement percentage is corrected. However, the embodiments of the present invention are not limited to this example. Namely, in another preferred embodiment of the present invention, the red light encounter frequency, i.e., the denominator of Equation (1), may be corrected. For example, the stop supplement frequency is updated by adding 1 to the pre-update stop supplement frequency, and the red light encounter frequency is updated by adding a product of 1 and the correction coefficient to the pre-update red light encounter frequency. In such case, unlike the above embodiment, the correction rules 40 preferably set the correction coefficient to a value under 1.0 if the traffic signal is red when the vehicle 3 passes the determination position A1, and set the correction coefficient to 1.0 if the traffic signal is not red. Therefore, the stop supplement percentage can be corrected to a higher value by correcting the increment of the red light encounter frequency to a smaller value. A configuration that corrects the increments of both the stop supplement frequency and the red light encounter frequency may also be used, as well as a configuration that sets the increments when updating to 1 for both the stop supplement frequency and the red light encounter frequency, without correcting either the stop supplement frequency or the red light encounter frequency. Furthermore, a configuration may be used that sets the increments when updating to 1 for both the stop supplement frequency and the red light frequency, and corrects the stop supplement percentage by adding or subtracting a predetermined value to or from the stop supplement percentage calculated based on Equation (1) or by multiplying the stop supplement percentage by a predetermined coefficient.

Instead of the display status of the traffic signal when the vehicle 3 passes the determination position A1, the correction coefficient may be set in accordance with a driving state (e.g. the vehicle speed or accelerator operation amount) of the vehicle 3 when the vehicle 3 passes the determination position A1. For example, if the stop supplementary operation is performed when either or both the vehicle speed and the accelerator operation amount are large at the time the vehicle 3 passes the determination position A1, the increment of the stop supplement frequency for updating the stop supplement frequency may be increased, the increment of the red light encounter frequency for updating the red light encounter frequency may be decreased, or both performed in order to increase the driver's awareness of safe driving before reaching the traffic signal installation point.

In addition to correcting the stop supplement percentage based on the status of the traffic signal at the determination position A1 and the state of the vehicle 3, a configuration may be used that corrects the stop supplement frequency and the red light encounter frequency, which are used to calculating the stop supplement percentage, in accordance with information acquired by the accident information acquisition unit 20 regarding the number of accidents that have occurred in the past at each traffic signal installation point. More specifically, if the driver is cautioned, i.e., the stop supplementary operation is performed, at a traffic signal installation point where many traffic accidents have occurred in the past, the increment of the stop supplement frequency for updating the stop supplement frequency may be increased, the increment of the red light encounter frequency for updating the red light encounter frequency may be decreased, or both performed.

Accordingly, the driver's awareness of safe driving can be increased by cautioning the driver more to drive safely at traffic signal installation points where there have been many accidents.

(2) In the embodiment described above, as an example, a case was explained in which if another vehicle 3 is detected within a predetermined distance ahead in the traveling direction of the vehicle 3 inside the stop supplement zone A2, the determination regarding whether to perform the stop supplementary operation in the stop supplement zone A2 is cancelled, and the stop supplement zone A2 in such case is excluded from the calculation of the stop supplement percentage. However, the embodiments of the present invention are not limited to this example. Namely, in another preferred embodiment of the present invention, whether to perform the stop supplementary operation in the stop supplement zone A2 may be determined regardless of whether there is another vehicle 3 present ahead within a predetermined distance in the traveling direction of the vehicle 3. Furthermore, according to the above embodiment, if there is another vehicle present ahead within a predetermined distance at the time the vehicle 3 stops at the traffic signal installation point, the yellow-light-stop determination unit 18 determines that the vehicle 3 has not stopped at a yellow light even though the traffic signal is yellow. However, the embodiments of the present invention are not limited to this example. Namely, in another preferred embodiment of the present invention, regardless of whether there is another vehicle 3 present ahead within a predetermined distance in the traveling direction of the vehicle 3, the stop may be determined as a yellow light stop if the traffic signal is yellow when the vehicle 3 stops at the traffic signal installation point.

(3) In the embodiment described above, as an example, a case was explained in which the notification processing unit 16 determines whether the driver's operation is suitable in terms of stopping the vehicle 3 at a red light based on the accelerator operation amount of the vehicle 3 at the red light encounter. If it is determined that the operation is not suitable, the notification processing unit 16 cautions the driver with the stop supplementary operation. However, the embodiments of the present invention are not limited to this example. Namely, the determination regarding whether to perform the stop supplementary operation may utilize any information in order to determine that the driver's driving operation is not decelerating the vehicle 3, the driver has no intent to decelerator, or the like. For example, instead of the accelerator operation amount, the determination regarding whether to perform the stop supplementary operation may be based on whether the brake is operated, the brake operation amount, information pertaining to the vehicle speed, and the like.

The above embodiment also gives an example in which the stop supplementary operation is an audio caution to the driver. However, the embodiments of the present invention are not limited to this example. Namely, the driver may be cautioned by an on-screen display via the display input device 47 that uses characters or icons. Furthermore, in another preferred embodiment of the present invention, a vehicle control may be executed as the stop supplementary operation instead of notifying the driver with a caution. In such case, an operation supplement such as a brake assist that supplements the driver's brake operation, or a stopping operation that stops the vehicle 3 such as forced braking that forcibly operates the brakes and a throttle closing control that forcibly sets the throttle opening to zero may be employed.

(4) In the embodiment described above, as an example, a case was explained in which Equation (2) is used to calculate the yellow-light-stop percentage and correct the stop supplement percentage. However, the embodiments of the present invention are not limited to this example. Namely, in another preferred embodiment of the present invention, only the yellow light stopping frequency may be used correct the stop supplement percentage without using the yellow light running frequency. For example, the stop supplement percentage may also be corrected by subtracting the product of the yellow light stopping frequency and a predetermined coefficient from the stop supplement frequency, which is the numerator of Equation (1). In addition, a configuration that counts all the traffic signal installation points passed by the vehicle 3, calculates a ratio of the yellow light stopping frequency to the total number of traffic signal installation points passed by the vehicle 3, subtracts the product of the ratio and a predetermined coefficient from the stop supplement percentage, and corrects the stop supplement percentage is another preferred embodiment of the present invention. Furthermore, a configuration that uses the yellow light stopping frequency and the yellow light running frequency, but does not correct the stop supplement percentage, may also be adopted.

(5) In the embodiment described above, as an example, a case was explained in which the traffic signal information acquisition unit 8 distinguishes the display status of a traffic signal present ahead in the traveling direction of the vehicle 3 from traffic signal information pertaining to the display status of traffic signals acquired from the road-to-vehicle communication unit 9. However, the embodiments of the present invention are not limited to this example. Namely, in another preferred embodiment of the present invention, the on-vehicle camera 5 may take an image that includes the traffic signal present ahead in the traveling direction of the vehicle 3, the image processing unit 6 may execute image processing for the image to detect the display status of the traffic signal, and the detection result may be output to the traffic signal information acquisition unit 8. In the case of such a configuration, it may not be possible to take an image of a traffic signal installed at a traffic signal installation point before a curve or the like. However, the display status of the traffic signal may be detected by taking an image of an advance signal or the like that indicates the display status of the traffic signal. Furthermore, a configuration may be adopted that acquires traffic signal information using image processing and also the road-to-vehicle communication unit 9, and distinguishes the display status of the traffic signal present ahead in the traveling direction of the vehicle 3 based on both these types of information.

(6) In the embodiment described above, as an example, a case was explained in which the location of the determination position A1 is set more forward than the stop supplement zone A2 in the traveling direction of the vehicle 3, and also set more forward in the traveling direction than a position at which the driver can visually recognize the display status of the traffic signal installed at the traffic signal installation point. However, the embodiments of the present invention are not limited to this example. Namely the position at which the driver can recognize the display status of the traffic signal is not limited to a position at which the driver can visually recognize the display status of the traffic signal. For example, communicating the traffic signal information acquired by the traffic signal information acquisition unit 8 to the driver through a screen provided in the display input device 47 or through the audio output device 48, and setting the position at which the communication is performed to a position at which the driver can recognize the display status of the traffic signal is another preferred embodiment of the present invention. According to this configuration, the location of the determination position A1 can be suitably set even in circumstances where the upcoming traffic signal before a curve or the like is not visible.

(7) In the embodiment described above, as an example, a case was explained in which length of the stop supplement zone A2 is set as a fixed value. However, the embodiments of the present invention are not limited to this example. Namely, in another preferred embodiment of the present embodiment, the length of the stop supplement zone A2 may be set in a variable manner depending on the current speed of the vehicle 3 each time the vehicle 3 approaches a traffic signal installation point. For example, the length of the stop supplement zone A2 may be set based on the speed of the vehicle 3 when the vehicle 3 passes the determination position A1. In such case, a braking distance corresponding to the speed or a stopping distance that adds a brake reaction distance to the braking distance can be used as the length of the stop supplement zone A2. By determining the stop supplement zone A2 in this manner, the length of the stop supplement zone A2 can be set to the minimum distance required for stopping the vehicle 3 at the traffic signal installation point.

(8) In the embodiment described above, as an example, a case was explained in which the evaluation information acquisition unit 8 acquires the point information 62, advice information, the evaluation graph information 64, the ranking information 65, and the level information 66 as the evaluation information 61, and outputs them in a manner understandable to the driver. However, the embodiments of the present invention are not limited to this example. Namely, in another preferred embodiment of the present invention, only a portion of the above information may be acquired as the evaluation information 61. In addition, various other information representing an evaluation pertaining to the stop supplement percentage may be acquired as the evaluation information 61. Furthermore, a configuration may be used that does not include the evaluation information acquisition unit 23 and outputs the stop supplement percentage using audio or a screen display in a manner understandable to the driver.

(9) In the embodiment described above, as an example, a case was explained in which the point calculation unit 24 provided in the navigation device 1 calculates the point for each trip and the total points acquired thus far, and stores these in the memory 32 of the navigation device 1. However, the embodiments of the present invention are not limited to this example. Namely, information regarding the points per trip as calculated by the point calculation unit 24 may be sent to the central control server 2 and the total points for each vehicle 3 calculated in the central control server 2. Alternatively, information regarding the stop supplement percentage per trip may be sent to the central control server 2, and the points per trip as well as the total points calculated in the central control server 2. In such case, the external information acquisition unit 27 acquires the information regarding the total points and the points per trip for the vehicle 3 from the central control server 2 through the transmitter-receiver unit 11 at a predetermined timing.

(10) In the embodiment described above, as an example, a case was explained in which the location of the traffic signal installation point is acquired based on the map data 34 (especially information representing the location of the traffic signal installation point) stored in the map database 31 provided in the navigation device 1. However, the embodiments of the present invention are not limited to this example. Namely, the road-to-vehicle communication unit 9 may acquire information pertaining to the traffic signal installation point (position coordinates of the traffic signal installation point, a remaining distance to the traffic signal installation point, etc.) from a communication device installed on the roadside. Also, the information pertaining to the traffic signal installation point (the position coordinates of the traffic signal installation point, the remaining distance to the traffic signal installation point, etc.) may be acquired based on information provided by a facility outside the vehicle 3, such as road traffic information or the like distributed from VICS (trademark: Vehicle Information and Communication System). In these cases, the distance from the traffic signal installation point to the host vehicle position is estimated based on information regarding the vehicle speed as detected by the distance sensor 43. The processes in the above embodiment are then executed based on the estimated distance from the traffic signal installation point to the host vehicle position.

(11) The allocation of components respectively provided in the navigation device 1 and the central control server 2 as described in the above embodiment is but one example. Accordingly, aside from components that must be provided on the navigation device 1 side, such as the host vehicle position information acquisition unit 12, each component may be provided in either the navigation device 1 or the central control server 2. Therefore, in another preferred embodiment of the present invention, the overall configuration of the safe driving evaluation system may be provided in the navigation device 1 acting as the on-vehicle terminal device. Therefore, in yet another preferred embodiment of the present invention, the main configuration of the safe driving evaluation system may be entirely provided in the central control server 2 acting as the central control device. Here, the main configuration of the safe driving evaluation system includes the notification processing unit 16 acting as the stop supplement unit, the percentage calculation unit 22, and the evaluation information acquisition unit 23.

(12) In the embodiment described above, as an example, a case was explained in which the on-vehicle terminal device that structures the safe driving evaluation system according to the present invention is the navigation device 1. However, the embodiments of the present invention are not limited to this example. Namely, in another preferred embodiment of the present invention, the on-vehicle terminal device that structures the safe driving evaluation system according to the present invention may be a control device of the vehicle 3 that is unrelated to the navigation device 1.

The present invention is well-suited for application to a safe driving evaluation system and a safe driving evaluation program that evaluate a driving operation of the driver before a traffic signal installation point.

What is claimed is:

1. A safe driving evaluation system comprising:

a traffic signal information acquisition unit that acquires traffic signal information that indicates a display status of a traffic signal present ahead in a traveling direction of a vehicle;

a zone determination unit that determines the vehicle is within a prescribed stop supplement zone set up in front of a traffic signal installation point at which the traffic signal is installed;

a red light determination unit that determines a red light encounter, which is a state where the vehicle is within the stop supplement zone and the traffic signal information indicates that the traffic signal is red;

a stop supplement unit that performs a stop supplementary operation with respect to a driver in order to stop the vehicle at the traffic signal installation point, based on a driving operation of the vehicle during the red light encounter; and a percentage calculation unit that calculates a stop supplement percentage as a ratio of a stop supplement frequency, which is a number of times the stop supplementary operation is performed, to a red light encounter frequency, which is the number of times the vehicle has the red light encounter.

2. The safe driving evaluation system according to claim 1, wherein the stop supplement unit performs the stop supplementary operation if an accelerator operation amount of the vehicle during the red light encounter is greater than a predetermined value.

3. The safe driving evaluation system according to claim 1, wherein, if the stop supplementary operation is performed, the percentage calculation unit corrects the stop supplement percentage to a higher value if the traffic signal information indicates that the traffic signal is red when the vehicle passes a prescribed determination position set before the stop supplement zone.

4. The safe driving evaluation system according to claim 3, wherein the determination position is set more forward in the traveling direction than a position at which the driver visually recognizes the display status of the traffic signal installed at the traffic signal installation point.

5. The safe driving evaluation system according to claim 1, wherein the traffic signal information acquisition unit uses at least one of information acquired through road-to-vehicle communication and information acquired from an image recognition result for an image taken of the traffic signal by an on-vehicle camera to acquire the traffic signal information.

6. The safe driving evaluation system according to claim 1, further comprising:

a yellow-light-stop determination unit that determines the vehicle has stopped at a yellow light if the traffic signal information indicates that the traffic signal is yellow when the vehicle stopped at the traffic signal installation point, wherein the percentage calculation unit corrects the stop supplement percentage to a lower value in accordance with a yellow light stopping frequency, which is the determined number of times of stopping at a yellow light.

7. The safe driving evaluation system according to claim 6, further comprising:

a yellow-light-run determination unit that determines the vehicle has run a yellow light if the traffic signal information indicates that the traffic signal is yellow when the vehicle passes the traffic signal installation point, wherein the percentage calculation unit corrects the stop supplement percentage in accordance with the yellow light stopping frequency and a yellow light running frequency, which is the determined number of times running of a yellow light.

8. The safe driving evaluation system according to claim 7, further comprising:

a preceding vehicle detection unit that detects another vehicle present ahead within a predetermined distance in the traveling direction of the host vehicle, wherein if another vehicle is detected ahead within the predetermined distance in the traveling direction of the host vehicle at the time the host vehicle stops at the traffic signal installation point, the yellow-light-stop determination unit determines that the host vehicle has not stopped at a yellow light even though the traffic signal information indicates that the traffic signal is yellow.

9. The safe driving evaluation system according to claim 6, further comprising:

a preceding vehicle detection unit that detects another vehicle present ahead within a predetermined distance in the traveling direction of the host vehicle, wherein if another vehicle is detected ahead within the predetermined distance in the traveling direction of the host vehicle at the time the host vehicle stops at the traffic signal installation point, the yellow-light-stop determination unit determines that the host vehicle has not stopped at a yellow light even though the traffic signal information indicates that the traffic signal is yellow.

10. The safe driving evaluation system according to claim 1, further comprising:

a preceding vehicle detection unit that detects another vehicle present ahead within a predetermined distance in the traveling direction of the host vehicle, wherein if the preceding vehicle detection unit detects another vehicle present ahead within a predetermined distance in the traveling direction of the host vehicle inside the stop supplement zone, the stop supplement zone is excluded from the calculation of the stop supplement percentage.

11. The safe driving evaluation system according to claim 1, further comprising:

an accident information acquisition unit that acquires information regarding a number of accidents that have occurred in the past at each traffic signal installation point, wherein when calculating the stop supplement percentage, for each traffic signal installation point at which the stop supplementary operation has been performed, the percentage calculation unit corrects the stop supplement percentage in accordance with the number of accidents at the traffic signal installation point.

12. The safe driving evaluation system according to claim 1, further comprising:

an evaluation information acquisition unit that acquires evaluation information based on the stop supplement percentage, wherein the evaluation information acquisition unit acquires as the evaluation information at least one of points assigned depending on the stop supplement percentage, advice having content depending on the stop supplement percentage, and a graph display that visually represents the stop supplement percentage at certain times.

13. The safe driving evaluation system according to claim 1, further comprising:

an evaluation information acquisition unit that acquires evaluation information based on the stop supplement percentage; and an information collection unit that collects information regarding the stop supplement percentage from a plurality of vehicles, wherein the evaluation information acquisition unit acquires as the evaluation information at least one of a ranking for each vehicle regarding the stop supplement percentage as compared to the other vehicles and a level assigned based on the past stop supplement percentages of each vehicle compared to the other vehicles.

14. The safe driving evaluation system according to claim 13, further comprising:

an on-vehicle terminal device installed in the vehicle; and a central control device provided in communication with a plurality of the on-vehicle terminal devices, wherein when a main power source of the vehicle installed with the on-vehicle terminal device is turned off, the on-vehicle terminal device sends information regarding the stop supplement percentage between turning the main power source on and off to the central control device, and the central control device generates the evaluation information for the on-vehicle terminal device based on the information regarding the stop supplement percentage received from the on-vehicle terminal device.

15. A computer-readable storage medium storing a computer-executable safe driving evaluation program, the program comprising:

instructions for acquiring traffic signal information that indicates a display status of a traffic signal present ahead in a traveling direction of a vehicle;

instructions for determining the vehicle is within a prescribed stop supplement zone set up in front of a traffic signal installation point at which a traffic signal is installed;

instructions for determining a red light encounter, which is a state where the vehicle is within the stop supplement zone and the traffic signal information indicates that the traffic signal is red;

instructions for performing a stop supplementary operation with respect to a driver in order to stop the vehicle at the traffic signal installation point, based on a driving operation of the vehicle during the red light encounter; and instructions for calculating a stop supplement percentage as a ratio of a stop supplement frequency, which is a number of times a stop supplementary operation is performed, to a red light encounter frequency, which is the number of times the vehicle has the red light encounter.

16. A safe driving evaluation method, comprising:

a step of a traffic signal information acquisition unit acquiring traffic signal information that indicates a display status of a traffic signal present ahead in a traveling direction of a vehicle;

a step of a zone determination unit determining the vehicle is within a prescribed stop supplement zone set up in front of a traffic signal installation point at which a traffic signal is installed;

a step of a red light determination unit determining a red light encounter, which is a state where the vehicle is within the stop supplement zone and the traffic signal information indicates that the traffic signal is red;

a step of a stop supplement unit performing a stop supplementary operation with respect to a driver in order to stop the vehicle at the traffic signal installation point, based on a driving operation of the vehicle during the red light encounter; and a step of a percentage calculation unit calculating a stop supplement percentage as a ratio of a stop supplement frequency, which is a number of times a stop supplementary operation is performed, to a red light encounter frequency, which is the number of times the vehicle has the red light encounter.

* * * * *